United States Patent
Rosenberg et al.

(10) Patent No.: US 8,359,616 B2
(45) Date of Patent: Jan. 22, 2013

(54) SYSTEMS AND METHODS FOR AUTOMATICALLY GENERATING ADVERTISEMENTS USING A MEDIA GUIDANCE APPLICATION

(75) Inventors: Scott Rosenberg, Glen Ridge, NJ (US); Marvin Carlberg, Los Angeles, CA (US)

(73) Assignee: United Video Properties, Inc., Santa Clara, CA (US)

( * ) Notice: Subject to any disclaimer, the term of this patent is extended or adjusted under 35 U.S.C. 154(b) by 460 days.

(21) Appl. No.: 12/571,304

(22) Filed: Sep. 30, 2009

(65) Prior Publication Data

US 2011/0078726 A1    Mar. 31, 2011

(51) Int. Cl.
*G06F 3/00* (2006.01)
*G06F 13/00* (2006.01)
*H04N 5/445* (2011.01)

(52) U.S. Cl. ............... 725/42; 725/41; 725/43; 725/45; 725/46; 725/47; 725/50; 725/53; 725/54; 725/34; 725/35; 725/36; 725/13; 725/115; 725/121; 725/145

(58) Field of Classification Search .............. None
See application file for complete search history.

(56) References Cited

U.S. PATENT DOCUMENTS

| | | |
|---|---|---|
| 3,440,427 A | 4/1969 | Kammer |
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |

(Continued)

FOREIGN PATENT DOCUMENTS

AU    731010    7/1998

(Continued)

OTHER PUBLICATIONS

"272OR Satellite Receiver User's Guide," General Instrument, 1991, pp. 58-61.

(Continued)

*Primary Examiner* — Dominic D Saltarelli
*Assistant Examiner* — Jason J Chung
(74) *Attorney, Agent, or Firm* — Ropes & Gray LLP

(57) ABSTRACT

Systems and methods for automatically generating advertisements using a media guidance application are provided. In some embodiments, an advertisement database is searched to identify a stored advertisement for display in an advertisement display region of a media guidance application display screen. Upon determining that the advertisement database does not include a suitable stored advertisement, a new advertisement may be generated for display in the advertisement display region.

20 Claims, 10 Drawing Sheets

U.S. PATENT DOCUMENTS

| | | |
|---|---|---|
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,799,683 A | 1/1989 | Bruner, Jr. |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,842,278 A | 6/1989 | Markowicz |
| 4,847,604 A | 7/1989 | Doyle |
| 4,847,698 A | 7/1989 | Freeman |
| 4,847,699 A | 7/1989 | Freeman |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |

| | | | | | |
|---|---|---|---|---|---|
| 5,083,271 A | 1/1992 | Thacher et al. | 5,359,601 A | 10/1994 | Wasilewski et al. |
| 5,083,800 A | 1/1992 | Lockton | 5,365,282 A | 11/1994 | Levine |
| 5,091,785 A | 2/1992 | Canfield et al. | 5,367,316 A | 11/1994 | Ikezaki |
| 5,093,921 A | 3/1992 | Bevins, Jr. | 5,367,330 A | 11/1994 | Haave et al. |
| 5,099,319 A | 3/1992 | Esch et al. | 5,371,551 A | 12/1994 | Logan et al. |
| 5,103,314 A | 4/1992 | Keenan | 5,373,288 A | 12/1994 | Blahut |
| 5,105,184 A | 4/1992 | Pirani et al. | 5,374,942 A | 12/1994 | Gilligan et al. |
| 5,109,414 A | 4/1992 | Harvey et al. | 5,374,951 A | 12/1994 | Welsh |
| 5,119,188 A | 6/1992 | McCalley et al. | 5,377,317 A | 12/1994 | Bates et al. |
| 5,121,476 A | 6/1992 | Yee | 5,377,319 A | 12/1994 | Kitahara et al. |
| 5,123,046 A | 6/1992 | Levine | 5,382,983 A | 1/1995 | Kwoh et al. |
| 5,126,851 A | 6/1992 | Yoshimura et al. | 5,384,910 A | 1/1995 | Torres |
| 5,148,154 A | 9/1992 | Mackay et al. | 5,387,945 A | 2/1995 | Takeuchi |
| 5,151,782 A | 9/1992 | Ferraro | 5,398,074 A | 3/1995 | Duffield et al. |
| 5,151,789 A | 9/1992 | Young | 5,404,393 A | 4/1995 | Remillard |
| 5,155,591 A | 10/1992 | Wachob | 5,408,417 A | 4/1995 | Wilder |
| 5,155,806 A | 10/1992 | Hoeber et al. | 5,410,326 A | 4/1995 | Goldstein |
| 5,157,768 A | 10/1992 | Hoeber et al. | 5,410,343 A | 4/1995 | Coddington et al. |
| 5,161,023 A | 11/1992 | Keenan | 5,410,344 A | 4/1995 | Graves et al. |
| 5,162,905 A | 11/1992 | Itoh et al. | 5,410,367 A | 4/1995 | Zahavi et al. |
| 5,170,388 A | 12/1992 | Endoh | 5,412,720 A | 5/1995 | Hoarty |
| 5,172,111 A | 12/1992 | Olivo, Jr. | 5,415,416 A | 5/1995 | Scagnelli et al. |
| 5,172,413 A | 12/1992 | Bradley et al. | 5,416,508 A | 5/1995 | Sakuma et al. |
| 5,177,604 A | 1/1993 | Martinez | 5,424,770 A | 6/1995 | Schmelzer et al. |
| 5,179,654 A | 1/1993 | Richards et al. | 5,425,101 A | 6/1995 | Woo et al. |
| 5,195,092 A | 3/1993 | Wilson et al. | 5,432,561 A | 7/1995 | Strubbe |
| 5,200,823 A | 4/1993 | Yoneda et al. | 5,434,626 A | 7/1995 | Hayashi et al. |
| 5,204,897 A | 4/1993 | Wyman | 5,436,676 A | 7/1995 | Pint et al. |
| 5,206,722 A | 4/1993 | Kwan | 5,438,372 A | 8/1995 | Tsumori et al. |
| 5,210,611 A | 5/1993 | Yee et al. | 5,438,423 A | 8/1995 | Lynch et al. |
| 5,212,553 A | 5/1993 | Maruoka | 5,440,678 A | 8/1995 | Eisen et al. |
| 5,214,622 A | 5/1993 | Nemoto et al. | 5,444,499 A | 8/1995 | Saitoh |
| 5,216,515 A | 6/1993 | Steele et al. | 5,446,488 A | 8/1995 | Vogel |
| 5,220,420 A | 6/1993 | Hoarty et al. | 5,446,919 A | 8/1995 | Wilkins |
| 5,223,924 A | 6/1993 | Strubbe | 5,452,012 A | 9/1995 | Saitoh |
| 5,227,874 A | 7/1993 | Von Kohorn | 5,459,522 A | 10/1995 | Pint |
| 5,231,493 A | 7/1993 | Apitz | 5,461,415 A | 10/1995 | Wolf et al. |
| RE34,340 E | 8/1993 | Freeman | 5,465,113 A | 11/1995 | Gilboy |
| 5,233,423 A | 8/1993 | Jernigan et al. | 5,465,385 A | 11/1995 | Ohga et al. |
| 5,233,654 A | 8/1993 | Harvey et al. | 5,469,206 A | 11/1995 | Strubbe et al. |
| 5,235,415 A | 8/1993 | Bonicel et al. | 5,477,262 A | 12/1995 | Banker et al. |
| 5,236,199 A | 8/1993 | Thompson, Jr. | 5,479,266 A | 12/1995 | Young et al. |
| 5,237,411 A | 8/1993 | Fink et al. | 5,479,268 A | 12/1995 | Young et al. |
| 5,237,417 A | 8/1993 | Hayashi et al. | 5,479,497 A | 12/1995 | Kovarik |
| 5,237,418 A | 8/1993 | Kaneko | 5,481,296 A | 1/1996 | Cragun et al. |
| 5,239,540 A | 8/1993 | Rovira et al. | 5,483,278 A | 1/1996 | Strubbe et al. |
| 5,241,428 A | 8/1993 | Goldwasser et al. | 5,485,197 A | 1/1996 | Hoarty |
| 5,245,420 A | 9/1993 | Harney et al. | 5,485,219 A | 1/1996 | Woo |
| 5,247,347 A | 9/1993 | Litteral et al. | 5,485,221 A | 1/1996 | Banker et al. |
| 5,247,364 A | 9/1993 | Banker et al. | 5,488,409 A | 1/1996 | Yuen et al. |
| 5,247,580 A | 9/1993 | Kimura et al. | 5,495,295 A | 2/1996 | Long |
| 5,249,044 A | 9/1993 | Von Kohorn | 5,502,504 A | 3/1996 | Marshall et al. |
| 5,253,066 A | 10/1993 | Vogel | 5,515,098 A | 5/1996 | Carles |
| 5,253,067 A | 10/1993 | Chaney et al. | 5,523,794 A | 6/1996 | Mankovitz et al. |
| 5,260,778 A | 11/1993 | Kauffman et al. | 5,523,796 A | 6/1996 | Marshall et al. |
| 5,260,788 A | 11/1993 | Takano et al. | 5,524,195 A | 6/1996 | Clanton, III et al. |
| 5,260,999 A | 11/1993 | Wyman | 5,526,034 A | 6/1996 | Hoarty et al. |
| 5,283,639 A | 2/1994 | Esch et al. | 5,526,035 A | 6/1996 | Lappington et al. |
| 5,283,819 A | 2/1994 | Glick et al. | 5,528,304 A | 6/1996 | Cherrick et al. |
| 5,285,278 A | 2/1994 | Holman | 5,532,735 A | 7/1996 | Blahut et al. |
| 5,301,028 A | 4/1994 | Banker et al. | 5,532,754 A | 7/1996 | Young et al. |
| 5,307,173 A | 4/1994 | Yuen et al. | 5,534,911 A | 7/1996 | Levitan |
| 5,311,423 A | 5/1994 | Clark | 5,537,141 A | 7/1996 | Harper et al. |
| 5,313,282 A | 5/1994 | Hayashi | 5,537,143 A | 7/1996 | Steingold et al. |
| 5,317,403 A | 5/1994 | Keenan | 5,539,822 A | 7/1996 | Lett |
| 5,319,445 A | 6/1994 | Fitts | 5,541,662 A | 7/1996 | Adams et al. |
| 5,323,234 A | 6/1994 | Kawasaki | 5,541,738 A | 7/1996 | Mankovitz |
| 5,323,240 A | 6/1994 | Amano et al. | 5,550,576 A | 8/1996 | Klosterman |
| 5,325,183 A | 6/1994 | Rhee | 5,557,338 A | 9/1996 | Maze et al. |
| 5,325,423 A | 6/1994 | Lewis | 5,557,721 A | 9/1996 | Fite et al. |
| 5,329,589 A | 7/1994 | Fraser et al. | 5,559,548 A | 9/1996 | Davis et al. |
| 5,335,277 A | 8/1994 | Harvey et al. | 5,559,549 A | 9/1996 | Hendricks et al. |
| 5,343,239 A | 8/1994 | Lappington et al. | 5,559,550 A | 9/1996 | Mankovitz |
| 5,347,167 A | 9/1994 | Singh | 5,559,942 A | 9/1996 | Gough et al. |
| 5,347,632 A | 9/1994 | Filepp et al. | 5,561,471 A | 10/1996 | Kim et al. |
| 5,351,075 A | 9/1994 | Herz et al. | 5,570,295 A | 10/1996 | Isenberg et al. |
| 5,353,121 A | 10/1994 | Young et al. | 5,572,442 A | 11/1996 | Schulhof et al. |
| 5,357,276 A | 10/1994 | Banker et al. | 5,574,962 A | 11/1996 | Fardeau et al. |
| 5,359,367 A | 10/1994 | Stockill | 5,579,055 A | 11/1996 | Hamilton et al. |

| | | | | | |
|---|---|---|---|---|---|
| 5,581,479 A | 12/1996 | McLaughlin et al. | 5,708,478 A | 1/1998 | Tognazzini |
| 5,582,364 A | 12/1996 | Trulin et al. | 5,710,601 A | 1/1998 | Marshall et al. |
| 5,583,560 A | 12/1996 | Florin et al. | 5,710,815 A | 1/1998 | Ming et al. |
| 5,583,561 A | 12/1996 | Baker et al. | 5,715,314 A | 2/1998 | Payne et al. |
| 5,583,563 A | 12/1996 | Wanderscheid et al. | 5,715,399 A | 2/1998 | Bezos |
| 5,585,838 A | 12/1996 | Lawler et al. | 5,717,452 A | 2/1998 | Janin et al. |
| 5,585,858 A | 12/1996 | Harper et al. | 5,721,827 A | 2/1998 | Logan et al. |
| 5,585,865 A | 12/1996 | Amano et al. | 5,721,829 A | 2/1998 | Dunn et al. |
| 5,585,866 A | 12/1996 | Miller et al. | 5,724,091 A | 3/1998 | Freeman et al. |
| 5,589,892 A | 12/1996 | Knee et al. | 5,724,521 A | 3/1998 | Dedrick |
| 5,592,551 A | 1/1997 | Lett et al. | 5,724,525 A | 3/1998 | Beyers, II et al. |
| 5,594,509 A | 1/1997 | Florin et al. | 5,727,060 A | 3/1998 | Young |
| 5,596,373 A | 1/1997 | White et al. | 5,727,163 A | 3/1998 | Bezos |
| 5,600,364 A | 2/1997 | Hendricks et al. | 5,729,280 A | 3/1998 | Inoue et al. |
| 5,600,366 A | 2/1997 | Schulman | 5,731,844 A | 3/1998 | Rauch et al. |
| 5,600,573 A | 2/1997 | Hendricks et al. | 5,734,444 A | 3/1998 | Yoshinobu |
| 5,602,582 A | 2/1997 | Wanderscheid et al. | 5,734,853 A | 3/1998 | Hendricks et al. |
| 5,602,596 A | 2/1997 | Claussen et al. | 5,734,893 A | 3/1998 | Li et al. |
| 5,602,597 A | 2/1997 | Bertram | 5,737,028 A | 4/1998 | Bertram et al. |
| 5,606,374 A | 2/1997 | Bertram | 5,737,030 A | 4/1998 | Hong et al. |
| 5,610,653 A | 3/1997 | Abecassis | 5,740,549 A | 4/1998 | Reilly et al. |
| 5,617,565 A | 4/1997 | Augenbraun et al. | 5,751,282 A | 5/1998 | Girard et al. |
| 5,619,247 A | 4/1997 | Russo | 5,752,159 A | 5/1998 | Faust et al. |
| 5,619,249 A | 4/1997 | Billock et al. | 5,752,160 A | 5/1998 | Dunn |
| 5,619,274 A | 4/1997 | Roop et al. | 5,754,258 A | 5/1998 | Hanaya et al. |
| 5,621,456 A | 4/1997 | Florin et al. | 5,754,771 A | 5/1998 | Epperson et al. |
| 5,623,613 A | 4/1997 | Rowe et al. | 5,754,939 A | 5/1998 | Herz et al. |
| 5,627,940 A | 5/1997 | Rohra et al. | 5,757,417 A | 5/1998 | Aras et al. |
| 5,629,732 A | 5/1997 | Moskowitz et al. | 5,758,257 A | 5/1998 | Herz et al. |
| 5,629,733 A | 5/1997 | Youman et al. | 5,758,259 A | 5/1998 | Lawler |
| 5,630,119 A | 5/1997 | Aristides et al. | 5,760,821 A | 6/1998 | Ellis et al. |
| 5,631,995 A | 5/1997 | Weissensteiner et al. | 5,761,372 A | 6/1998 | Yoshinobu et al. |
| 5,632,007 A | 5/1997 | Freeman | 5,761,601 A | 6/1998 | Nemirofsky et al. |
| 5,633,683 A | 5/1997 | Rosengren et al. | 5,761,606 A | 6/1998 | Wolzien |
| 5,635,978 A | 6/1997 | Alten et al. | 5,768,528 A | 6/1998 | Stumm |
| 5,635,979 A | 6/1997 | Kostreski et al. | 5,774,170 A | 6/1998 | Hite et al. |
| 5,635,989 A | 6/1997 | Rothmuller | 5,774,186 A | 6/1998 | Brodsky et al. |
| 5,636,346 A | 6/1997 | Saxe | 5,774,357 A | 6/1998 | Hoffberg et al. |
| 5,640,501 A | 6/1997 | Turpin | 5,774,534 A | 6/1998 | Mayer |
| 5,640,577 A | 6/1997 | Scharmer | 5,774,664 A | 6/1998 | Hidary et al. |
| 5,642,153 A | 6/1997 | Chaney et al. | 5,774,666 A | 6/1998 | Portuesi |
| 5,648,813 A | 7/1997 | Tanigawa et al. | 5,774,887 A | 6/1998 | Wolff et al. |
| 5,648,824 A | 7/1997 | Dunn et al. | 5,778,181 A | 7/1998 | Hidary et al. |
| 5,650,826 A | 7/1997 | Eitz | 5,778,182 A | 7/1998 | Cathey et al. |
| 5,650,831 A | 7/1997 | Farwell | 5,781,226 A | 7/1998 | Sheehan |
| 5,652,613 A | 7/1997 | Lazarus et al. | 5,781,228 A | 7/1998 | Sposato |
| 5,652,615 A | 7/1997 | Bryant et al. | 5,781,245 A | 7/1998 | Van Der Weij et al. |
| 5,654,748 A | 8/1997 | Matthews, III | 5,781,246 A | 7/1998 | Alten et al. |
| 5,654,886 A | 8/1997 | Zereski, Jr. et al. | 5,784,258 A | 7/1998 | Quinn |
| 5,657,072 A | 8/1997 | Aristides et al. | 5,790,202 A | 8/1998 | Kummer et al. |
| 5,657,091 A | 8/1997 | Bertram | 5,790,426 A | 8/1998 | Robinson |
| 5,659,350 A | 8/1997 | Hendricks et al. | 5,793,438 A | 8/1998 | Bedard |
| 5,659,366 A | 8/1997 | Kerman | 5,793,964 A | 8/1998 | Rogers et al. |
| 5,661,516 A | 8/1997 | Carles | 5,798,785 A | 8/1998 | Hendricks et al. |
| 5,661,517 A | 8/1997 | Budow et al. | 5,801,747 A | 9/1998 | Bedard |
| 5,663,757 A | 9/1997 | Morales | 5,801,785 A | 9/1998 | Crump et al. |
| 5,664,111 A | 9/1997 | Nahan et al. | 5,801,787 A | 9/1998 | Schein et al. |
| 5,666,293 A | 9/1997 | Metz et al. | 5,802,284 A | 9/1998 | Karlton et al. |
| 5,666,498 A | 9/1997 | Amro | 5,805,154 A | 9/1998 | Brown |
| 5,666,645 A | 9/1997 | Thomas et al. | 5,805,167 A | 9/1998 | van Cruyningen |
| 5,671,276 A | 9/1997 | Eyer et al. | 5,805,235 A | 9/1998 | Bedard |
| 5,671,411 A | 9/1997 | Watts et al. | 5,805,763 A | 9/1998 | Lawler et al. |
| 5,675,390 A | 10/1997 | Schindler et al. | 5,805,804 A | 9/1998 | Laursen et al. |
| 5,675,752 A | 10/1997 | Scott et al. | 5,808,608 A | 9/1998 | Young et al. |
| 5,677,708 A | 10/1997 | Matthews, III et al. | 5,808,694 A | 9/1998 | Usui et al. |
| 5,682,195 A | 10/1997 | Hendricks et al. | 5,809,204 A | 9/1998 | Young et al. |
| 5,682,196 A | 10/1997 | Freeman | 5,812,205 A | 9/1998 | Milnes et al. |
| 5,682,206 A | 10/1997 | Wehmeyer et al. | 5,815,145 A | 9/1998 | Matthews, III |
| 5,687,331 A | 11/1997 | Volk et al. | 5,815,671 A | 9/1998 | Morrison |
| 5,689,648 A | 11/1997 | Diaz et al. | 5,818,438 A | 10/1998 | Howe et al. |
| 5,689,666 A | 11/1997 | Berquist et al. | 5,818,439 A | 10/1998 | Nagasaka et al. |
| 5,692,214 A | 11/1997 | Levine | 5,818,441 A | 10/1998 | Throckmorton et al. |
| 5,694,163 A | 12/1997 | Harrison | 5,818,541 A | 10/1998 | Matsuura et al. |
| 5,694,176 A | 12/1997 | Bruette et al. | 5,818,935 A | 10/1998 | Maa |
| 5,694,381 A | 12/1997 | Sako | 5,819,019 A | 10/1998 | Nelson |
| 5,696,905 A | 12/1997 | Reimer et al. | 5,819,156 A | 10/1998 | Belmont |
| 5,699,107 A | 12/1997 | Lawler et al. | 5,819,284 A | 10/1998 | Farber et al. |
| 5,699,125 A | 12/1997 | Rzeszewski et al. | 5,822,123 A | 10/1998 | Davis et al. |
| 5,701,383 A | 12/1997 | Russo et al. | 5,826,168 A | 10/1998 | Inoue et al. |

| Patent Number | Date | Inventor(s) | Patent Number | Date | Inventor(s) |
|---|---|---|---|---|---|
| 5,828,370 A | 10/1998 | Moeller et al. | 6,014,502 A | 1/2000 | Moraes |
| 5,828,402 A | 10/1998 | Collings | 6,016,141 A | 1/2000 | Knudson et al. |
| 5,828,419 A | 10/1998 | Bruette et al. | 6,018,372 A | 1/2000 | Etheredge |
| 5,828,420 A | 10/1998 | Marshall et al. | 6,018,768 A | 1/2000 | Ullman et al. |
| 5,828,839 A | 10/1998 | Moncreiff | 6,020,883 A | 2/2000 | Herz et al. |
| 5,828,945 A | 10/1998 | Klosterman | 6,020,912 A | 2/2000 | De Lang |
| 5,830,068 A | 11/1998 | Brenner et al. | 6,020,929 A | 2/2000 | Marshall et al. |
| 5,838,314 A | 11/1998 | Neel et al. | 6,024,641 A | 2/2000 | Sarno |
| 5,842,010 A | 11/1998 | Jain et al. | 6,025,837 A | 2/2000 | Matthews, III et al. |
| 5,842,199 A | 11/1998 | Miller et al. | 6,025,886 A | 2/2000 | Koda |
| 5,844,620 A | 12/1998 | Coleman et al. | 6,028,599 A | 2/2000 | Yuen et al. |
| 5,847,750 A | 12/1998 | Srivastava et al. | 6,029,045 A | 2/2000 | Picco et al. |
| 5,848,352 A | 12/1998 | Dougherty et al. | 6,029,195 A | 2/2000 | Herz |
| 5,848,396 A | 12/1998 | Gerace | 6,035,304 A | 3/2000 | Machida et al. |
| 5,848,397 A | 12/1998 | Marsh et al. | 6,038,367 A | 3/2000 | Abecassis |
| 5,850,218 A | 12/1998 | LaJoie et al. | 6,047,317 A | 4/2000 | Bisdikian et al. |
| 5,857,911 A | 1/1999 | Fioretti | 6,049,539 A | 4/2000 | Lee et al. |
| 5,861,881 A | 1/1999 | Freeman et al. | 6,049,824 A | 4/2000 | Simonin |
| 5,862,292 A | 1/1999 | Kubota et al. | 6,052,145 A | 4/2000 | Macrae et al. |
| 5,867,226 A | 2/1999 | Wehmeyer | 6,061,060 A | 5/2000 | Berry et al. |
| 5,867,227 A | 2/1999 | Yamaguchi | 6,061,097 A | 5/2000 | Satterfield |
| 5,872,588 A | 2/1999 | Aras et al. | 6,061,719 A | 5/2000 | Bendinelli et al. |
| 5,874,985 A | 2/1999 | Matthews, III | 6,064,376 A | 5/2000 | Berezowski et al. |
| 5,875,108 A | 2/1999 | Hoffberg et al. | 6,064,980 A | 5/2000 | Jacobi et al. |
| 5,880,768 A | 3/1999 | Lemmons et al. | 6,067,303 A | 5/2000 | Aaker et al. |
| 5,883,677 A | 3/1999 | Hofmann | 6,072,460 A | 6/2000 | Marshall et al. |
| 5,884,141 A | 3/1999 | Inoue et al. | 6,075,526 A | 6/2000 | Rothmuller |
| 5,886,691 A | 3/1999 | Furuya et al. | 6,075,551 A | 6/2000 | Berezowski et al. |
| 5,886,731 A | 3/1999 | Ebisawa | 6,075,575 A | 6/2000 | Schein et al. |
| 5,887,243 A | 3/1999 | Harvey et al. | 6,078,348 A | 6/2000 | Klosterman et al. |
| 5,892,498 A | 4/1999 | Marshall et al. | 6,081,750 A | 6/2000 | Hoffberg et al. |
| 5,892,535 A | 4/1999 | Allen et al. | 6,088,722 A | 7/2000 | Herz et al. |
| 5,900,905 A | 5/1999 | Shoff et al. | 6,091,883 A | 7/2000 | Artigalas et al. |
| 5,903,314 A | 5/1999 | Niijima et al. | 6,097,383 A | 8/2000 | Gaughan et al. |
| 5,903,545 A | 5/1999 | Sabourin et al. | 6,098,065 A | 8/2000 | Skillen et al. |
| 5,903,816 A | 5/1999 | Broadwin et al. | 6,108,042 A | 8/2000 | Adams et al. |
| 5,905,497 A | 5/1999 | Vaughan et al. | 6,111,614 A | 8/2000 | Mugura et al. |
| 5,907,323 A | 5/1999 | Lawler et al. | 6,112,186 A | 8/2000 | Bergh et al. |
| 5,907,366 A | 5/1999 | Farmer et al. | 6,115,057 A | 9/2000 | Kwoh et al. |
| 5,914,746 A | 6/1999 | Matthews, III et al. | 6,118,492 A | 9/2000 | Milnes et al. |
| 5,917,481 A | 6/1999 | Rzeszewski et al. | 6,119,098 A | 9/2000 | Guyot et al. |
| 5,917,830 A | 6/1999 | Chen et al. | 6,119,101 A | 9/2000 | Peckover |
| 5,918,014 A | 6/1999 | Robinson | 6,122,011 A | 9/2000 | Dias et al. |
| 5,920,700 A | 7/1999 | Gordon et al. | 6,125,230 A | 9/2000 | Yaginuma |
| 5,921,865 A | 7/1999 | Scagnelli et al. | 6,133,909 A | 10/2000 | Schein et al. |
| 5,929,849 A | 7/1999 | Kikinis | 6,138,155 A | 10/2000 | Davis et al. |
| 5,929,850 A | 7/1999 | Broadwin et al. | 6,141,003 A | 10/2000 | Chor et al. |
| 5,936,661 A | 8/1999 | Trew | 6,144,375 A | 11/2000 | Jain et al. |
| 5,936,679 A | 8/1999 | Kasahara et al. | 6,147,714 A | 11/2000 | Terasawa et al. |
| 5,940,073 A | 8/1999 | Klosterman et al. | 6,151,017 A | 11/2000 | Suzuoka et al. |
| 5,940,572 A | 8/1999 | Balaban et al. | 6,151,059 A | 11/2000 | Schein et al. |
| 5,945,988 A | 8/1999 | Williams et al. | 6,154,203 A | 11/2000 | Yuen et al. |
| 5,951,642 A | 9/1999 | Onoe et al. | 6,157,413 A | 12/2000 | Hanafee et al. |
| 5,956,026 A | 9/1999 | Ratakonda | 6,160,545 A | 12/2000 | Eyer et al. |
| 5,959,688 A | 9/1999 | Schein et al. | 6,160,546 A | 12/2000 | Thompson et al. |
| 5,960,411 A | 9/1999 | Hartman et al. | 6,160,570 A | 12/2000 | Sitnik |
| 5,961,603 A | 10/1999 | Kunkel et al. | 6,163,316 A | 12/2000 | Killian |
| 5,973,683 A | 10/1999 | Cragun et al. | 6,168,521 B1 | 1/2001 | Luciano et al. |
| 5,973,684 A | 10/1999 | Brooks et al. | 6,169,542 B1 | 1/2001 | Hooks et al. |
| 5,974,222 A | 10/1999 | Yuen et al. | 6,172,674 B1 | 1/2001 | Etheredge |
| 5,977,964 A | 11/1999 | Williams et al. | 6,172,677 B1 | 1/2001 | Stautner et al. |
| 5,986,650 A | 11/1999 | Ellis et al. | 6,173,271 B1 | 1/2001 | Goodman et al. |
| 5,987,210 A | 11/1999 | Iggulden et al. | 6,177,931 B1 | 1/2001 | Alexander et al. |
| 5,988,078 A | 11/1999 | Levine | 6,178,446 B1 | 1/2001 | Gerszberg et al. |
| 5,990,881 A | 11/1999 | Inoue et al. | 6,181,335 B1 | 1/2001 | Hendricks et al. |
| 5,990,890 A | 11/1999 | Etheredge | 6,186,443 B1 | 2/2001 | Shaffer |
| 5,990,927 A | 11/1999 | Hendricks et al. | 6,188,428 B1 | 2/2001 | Koz et al. |
| 5,995,092 A | 11/1999 | Yuen et al. | 6,191,780 B1 | 2/2001 | Martin et al. |
| 5,999,912 A | 12/1999 | Wodarz et al. | 6,202,212 B1 | 3/2001 | Sturgeon et al. |
| 6,002,393 A | 12/1999 | Hite et al. | 6,209,129 B1 | 3/2001 | Carr et al. |
| 6,002,394 A | 12/1999 | Schein et al. | 6,209,130 B1 | 3/2001 | Rector, Jr. et al. |
| 6,005,562 A | 12/1999 | Shiga et al. | 6,216,264 B1 | 4/2001 | Maze et al. |
| 6,005,565 A | 12/1999 | Legall et al. | 6,219,837 B1 | 4/2001 | Yeo et al. |
| 6,005,597 A | 12/1999 | Barrett et al. | 6,226,444 B1 | 5/2001 | Goldschmidt Iki et al. |
| 6,006,257 A | 12/1999 | Slezak | 6,233,389 B1 | 5/2001 | Barton et al. |
| 6,006,265 A | 12/1999 | Rangan et al. | 6,239,794 B1 | 5/2001 | Yuen et al. |
| 6,008,802 A | 12/1999 | Iki et al. | 6,240,555 B1 | 5/2001 | Shoff et al. |
| 6,011,546 A | 1/2000 | Bertram | 6,253,203 B1 | 6/2001 | O'Flaherty et al. |
| 6,014,137 A | 1/2000 | Burns | 6,256,071 B1 | 7/2001 | Hiroi |

| Patent | Kind | Date | Inventor |
|---|---|---|---|
| 6,256,785 | B1 | 7/2001 | Klappert et al. |
| 6,257,268 | B1 | 7/2001 | Hope et al. |
| 6,259,441 | B1 | 7/2001 | Ahmad et al. |
| 6,262,721 | B1 | 7/2001 | Tsukidate et al. |
| 6,263,501 | B1 | 7/2001 | Schein et al. |
| 6,263,505 | B1 | 7/2001 | Walker et al. |
| 6,263,507 | B1 | 7/2001 | Ahmad et al. |
| 6,268,849 | B1 | 7/2001 | Boyer et al. |
| 6,275,268 | B1 | 8/2001 | Ellis et al. |
| 6,277,026 | B1 | 8/2001 | Archer |
| 6,279,157 | B1 | 8/2001 | Takasu |
| 6,282,713 | B1 * | 8/2001 | Kitsukawa et al. ............ 725/36 |
| 6,285,713 | B1 | 9/2001 | Nakaya et al. |
| 6,286,140 | B1 | 9/2001 | Ivanyi |
| 6,289,346 | B1 | 9/2001 | Milewski et al. |
| 6,298,482 | B1 | 10/2001 | Seidman et al. |
| 6,311,877 | B1 | 11/2001 | Yang et al. |
| 6,312,336 | B1 | 11/2001 | Handelman et al. |
| 6,320,588 | B1 | 11/2001 | Palmer et al. |
| 6,323,911 | B1 | 11/2001 | Schein et al. |
| 6,325,716 | B1 | 12/2001 | Walker et al. |
| 6,331,877 | B1 | 12/2001 | Bennington et al. |
| 6,341,195 | B1 | 1/2002 | Mankovitz et al. |
| 6,342,926 | B1 | 1/2002 | Hanafee et al. |
| 6,349,410 | B1 | 2/2002 | Lortz |
| 6,357,042 | B2 | 3/2002 | Srinivasan et al. |
| 6,363,204 | B1 | 3/2002 | Johnson et al. |
| 6,363,525 | B1 | 3/2002 | Dougherty et al. |
| 6,381,582 | B1 | 4/2002 | Walker et al. |
| 6,388,714 | B1 | 5/2002 | Schein et al. |
| 6,389,593 | B1 | 5/2002 | Yamagishi |
| 6,392,664 | B1 | 5/2002 | White et al. |
| 6,392,710 | B1 | 5/2002 | Gonsalves et al. |
| 6,396,546 | B1 | 5/2002 | Alten et al. |
| 6,400,407 | B1 | 6/2002 | Zigmond et al. |
| 6,405,371 | B1 | 6/2002 | Oosterhout et al. |
| 6,408,437 | B1 | 6/2002 | Hendricks et al. |
| 6,411,308 | B1 | 6/2002 | Blonstein et al. |
| 6,412,110 | B1 | 6/2002 | Schein et al. |
| 6,418,556 | B1 | 7/2002 | Bennington et al. |
| 6,421,067 | B1 | 7/2002 | Kamen et al. |
| 6,430,743 | B1 | 8/2002 | Matsuura |
| 6,437,836 | B1 | 8/2002 | Huang et al. |
| 6,446,261 | B1 | 9/2002 | Rosser |
| 6,453,471 | B1 | 9/2002 | Klosterman |
| 6,463,585 | B1 | 10/2002 | Hendricks et al. |
| 6,469,753 | B1 | 10/2002 | Klosterman et al. |
| 6,470,497 | B1 | 10/2002 | Ellis et al. |
| 6,477,579 | B1 | 11/2002 | Kunkel et al. |
| 6,477,705 | B1 | 11/2002 | Yuen et al. |
| 6,483,986 | B1 | 11/2002 | Krapf |
| 6,486,920 | B2 | 11/2002 | Arai et al. |
| 6,490,722 | B1 | 12/2002 | Barton et al. |
| 6,498,895 | B2 | 12/2002 | Young et al. |
| 6,505,348 | B1 | 1/2003 | Knowles et al. |
| 6,515,680 | B1 | 2/2003 | Hendricks et al. |
| 6,539,548 | B1 | 3/2003 | Hendricks et al. |
| 6,542,169 | B1 | 4/2003 | Marshall et al. |
| 6,546,556 | B1 | 4/2003 | Kataoka et al. |
| 6,564,378 | B1 | 5/2003 | Satterfield et al. |
| 6,564,379 | B1 | 5/2003 | Knudson et al. |
| 6,574,424 | B1 | 6/2003 | Dimitri et al. |
| 6,580,870 | B1 | 6/2003 | Kanazawa et al. |
| 6,588,013 | B1 | 7/2003 | Lumley et al. |
| 6,598,228 | B2 | 7/2003 | Hejna, Jr. |
| 6,600,364 | B1 | 7/2003 | Liang et al. |
| 6,600,503 | B2 | 7/2003 | Stautner et al. |
| 6,606,128 | B2 | 8/2003 | Hanafee et al. |
| 6,609,253 | B1 | 8/2003 | Swix et al. |
| 6,614,987 | B1 | 9/2003 | Ismail et al. |
| 6,622,306 | B1 | 9/2003 | Kamada |
| 6,631,523 | B1 | 10/2003 | Matthews, III et al. |
| 6,637,027 | B1 | 10/2003 | Breslauer et al. |
| 6,642,939 | B1 | 11/2003 | Vallone et al. |
| 6,651,251 | B1 | 11/2003 | Shoff et al. |
| 6,660,503 | B2 | 12/2003 | Kierulff |
| 6,661,468 | B2 | 12/2003 | Alten et al. |
| 6,665,869 | B1 | 12/2003 | Ellis et al. |
| 6,687,906 | B1 | 2/2004 | Yuen et al. |
| 6,698,020 | B1 | 2/2004 | Zigmond et al. |
| 6,701,528 | B1 | 3/2004 | Arsenault et al. |
| 6,728,713 | B1 | 4/2004 | Beach et al. |
| 6,732,369 | B1 | 5/2004 | Schein et al. |
| 6,738,978 | B1 | 5/2004 | Hendricks et al. |
| 6,742,183 | B1 | 5/2004 | Reynolds et al. |
| 6,751,800 | B1 | 6/2004 | Fukuda et al. |
| 6,756,997 | B1 | 6/2004 | Ward, III et al. |
| 6,757,906 | B1 | 6/2004 | Look et al. |
| 6,799,326 | B2 | 9/2004 | Boylan, III et al. |
| 6,799,327 | B1 | 9/2004 | Reynolds et al. |
| 6,802,074 | B1 | 10/2004 | Mitsui et al. |
| 6,828,993 | B1 | 12/2004 | Hendricks et al. |
| 6,847,778 | B1 | 1/2005 | Vallone et al. |
| 6,850,691 | B1 | 2/2005 | Stam et al. |
| 6,868,440 | B1 | 3/2005 | Gupta et al. |
| 6,868,551 | B1 | 3/2005 | Lawler et al. |
| 6,938,208 | B2 | 8/2005 | Reichardt |
| 6,973,669 | B2 | 12/2005 | Daniels |
| 6,983,478 | B1 | 1/2006 | Grauch et al. |
| 7,003,792 | B1 | 2/2006 | Yuen |
| 7,017,173 | B1 | 3/2006 | Armstrong et al. |
| 7,028,326 | B1 | 4/2006 | Westlake et al. |
| 7,039,935 | B2 | 5/2006 | Knudson et al. |
| 7,069,576 | B1 | 6/2006 | Knudson et al. |
| 7,103,904 | B1 * | 9/2006 | Blackketter et al. ............ 725/32 |
| 7,185,355 | B1 | 2/2007 | Ellis et al. |
| 7,187,847 | B2 | 3/2007 | Young et al. |
| 7,266,833 | B2 | 9/2007 | Ward, III et al. |
| 7,287,267 | B2 | 10/2007 | Knudson et al. |
| 7,293,276 | B2 | 11/2007 | Phillips et al. |
| 7,328,450 | B2 | 2/2008 | Macrae et al. |
| 7,359,619 | B1 | 4/2008 | O'Connor et al. |
| 7,392,532 | B2 | 6/2008 | White et al. |
| 7,480,929 | B2 | 1/2009 | Klosterman et al. |
| 7,493,641 | B2 | 2/2009 | Klosterman et al. |
| 7,503,055 | B2 | 3/2009 | Reynolds et al. |
| 7,634,786 | B2 | 12/2009 | Knee et al. |
| 7,653,923 | B2 | 1/2010 | Flickinger |
| 7,665,109 | B2 | 2/2010 | Matthews, III et al. |
| 7,716,700 | B2 | 5/2010 | Carlucci et al. |
| 2001/0001160 | A1 | 5/2001 | Shoff et al. |
| 2001/0029610 | A1 | 10/2001 | Corvin et al. |
| 2001/0042246 | A1 | 11/2001 | Yuen et al. |
| 2001/0047298 | A1 | 11/2001 | Moore et al. |
| 2001/0049820 | A1 | 12/2001 | Barton |
| 2001/0054181 | A1 | 12/2001 | Corwin |
| 2002/0010623 | A1 | 1/2002 | McCollom et al. |
| 2002/0037160 | A1 | 3/2002 | Locket et al. |
| 2002/0042913 | A1 | 4/2002 | Ellis et al. |
| 2002/0042914 | A1 | 4/2002 | Walker et al. |
| 2002/0042918 | A1 | 4/2002 | Townsend et al. |
| 2002/0059602 | A1 | 5/2002 | Macrae et al. |
| 2002/0073424 | A1 | 6/2002 | Ward, III et al. |
| 2002/0083439 | A1 | 6/2002 | Eldering |
| 2002/0092017 | A1 | 7/2002 | Klosterman et al. |
| 2002/0124249 | A1 | 9/2002 | Shintani et al. |
| 2002/0144262 | A1 | 10/2002 | Plotnick et al. |
| 2002/0146233 | A1 | 10/2002 | Barton et al. |
| 2002/0191954 | A1 | 12/2002 | Beach et al. |
| 2002/0199186 | A1 | 12/2002 | Ali et al. |
| 2003/0005432 | A1 | 1/2003 | Ellis et al. |
| 2003/0005445 | A1 | 1/2003 | Schein et al. |
| 2003/0026589 | A1 | 2/2003 | Barton et al. |
| 2003/0028761 | A1 | 2/2003 | Platt |
| 2003/0037333 | A1 | 2/2003 | Ghashghai et al. |
| 2003/0101454 | A1 | 5/2003 | Ozer et al. |
| 2003/0110499 | A1 | 6/2003 | Knudson et al. |
| 2003/0131252 | A1 | 7/2003 | Barton |
| 2003/0131359 | A1 | 7/2003 | Moskowitz |
| 2003/0139966 | A1 * | 7/2003 | Sirota et al. ............ 705/14 |
| 2003/0164858 | A1 | 9/2003 | Klosterman et al. |
| 2003/0182567 | A1 | 9/2003 | Barton et al. |
| 2003/0188311 | A1 | 10/2003 | Yuen et al. |
| 2003/0196201 | A1 | 10/2003 | Schein et al. |
| 2003/0196203 | A1 | 10/2003 | Ellis et al. |
| 2003/0204847 | A1 | 10/2003 | Ellis et al. |
| 2003/0208758 | A1 | 11/2003 | Schein et al. |
| 2003/0219227 | A1 | 11/2003 | Otala et al. |

| | | | | | |
|---|---|---|---|---|---|
| 2004/0003407 A1 | 1/2004 | Hanafee et al. | EP | 0 775 417 | 5/1997 |
| 2004/0013406 A1 | 1/2004 | Barton et al. | EP | 0 784 405 | 7/1997 |
| 2004/0013409 A1 | 1/2004 | Beach et al. | EP | 0 805 594 | 11/1997 |
| 2004/0049787 A1 | 3/2004 | Maissel et al. | EP | 0 822 718 | 2/1998 |
| 2004/0078809 A1 | 4/2004 | Drazin | EP | 0 827 340 | 3/1998 |
| 2004/0111742 A1 | 6/2004 | Hendricks et al. | EP | 0 834 798 | 4/1998 |
| 2004/0194131 A1 | 9/2004 | Ellis et al. | EP | 0 836 320 | 4/1998 |
| 2004/0194138 A1 | 9/2004 | Boylan, III et al. | EP | 0 838 820 | 4/1998 |
| 2004/0223747 A1 | 11/2004 | Otala et al. | EP | 0 848 554 | 6/1998 |
| 2004/0226035 A1* | 11/2004 | Hauser, Jr. ............. 725/9 | EP | 0 849 948 | 6/1998 |
| 2004/0237102 A1 | 11/2004 | Konig et al. | EP | 0 851 681 | 7/1998 |
| 2005/0076359 A1 | 4/2005 | Pierson et al. | EP | 0 852 442 | 7/1998 |
| 2005/0097622 A1 | 5/2005 | Zigmond et al. | EP | 0 854 645 | 7/1998 |
| 2005/0157217 A1 | 7/2005 | Hendricks | EP | 0 854 654 | 7/1998 |
| 2005/0160458 A1* | 7/2005 | Baumgartner .......... 725/46 | EP | 0 880 856 | 12/1998 |
| 2005/0198668 A1 | 9/2005 | Yuen et al. | EP | 0 905 985 | 3/1999 |
| 2005/0204382 A1 | 9/2005 | Ellis | EP | 0 924 927 | 6/1999 |
| 2005/0216936 A1* | 9/2005 | Knudson et al. ........ 725/42 | EP | 0 935 393 | 8/1999 |
| 2005/0235318 A1* | 10/2005 | Grauch et al. .......... 725/46 | EP | 0 944 253 | 9/1999 |
| 2005/0240961 A1 | 10/2005 | Jerding et al. | EP | 0 963 119 | 12/1999 |
| 2005/0244138 A1 | 11/2005 | O'Connor et al. | EP | 0 988 876 | 3/2000 |
| 2005/0283796 A1 | 12/2005 | Flickinger | EP | 1 095 504 | 5/2001 |
| 2006/0248555 A1 | 11/2006 | Eldering | EP | 1 499 113 | 8/2004 |
| 2007/0050244 A1* | 3/2007 | Stevens ................. 705/14 | EP | 1 705 908 | 9/2006 |
| 2007/0243155 A1 | 10/2007 | Schein et al. | FR | 2662895 | 12/1991 |
| 2008/0010129 A1* | 1/2008 | Maggio .................. 705/14 | GB | 1 554 411 | 10/1979 |
| 2008/0127246 A1 | 5/2008 | Sylvain | GB | 2 034 995 | 6/1980 |
| 2008/0178221 A1 | 7/2008 | Schein et al. | GB | 2 126 002 | 3/1984 |
| 2008/0184315 A1 | 7/2008 | Ellis et al. | GB | 2 147 773 | 5/1985 |
| 2008/0189744 A1 | 8/2008 | Schein et al. | GB | 2 185 670 | 7/1987 |
| 2008/0235725 A1 | 9/2008 | Hendricks | GB | 2 229 595 | 9/1990 |
| | | | GB | 2 232 031 | 11/1990 |
| FOREIGN PATENT DOCUMENTS | | | GB | 2 256 546 | 12/1992 |
| | | | GB | 2 264 409 | 8/1993 |
| AU | 733993 | 2/1999 | GB | 2 300 535 | 11/1996 |
| CA | 1030505 | 5/1978 | GB | 2 307 381 | 5/1997 |
| CA | 1187197 | 5/1985 | GB | 2 309 134 | 7/1997 |
| CA | 1188811 | 6/1985 | JP | 58-137334 | 8/1983 |
| CA | 1196082 | 10/1985 | JP | 58-196738 | 11/1983 |
| CA | 1200911 | 2/1986 | JP | 58-210776 | 12/1983 |
| CA | 2151458 | 6/1994 | JP | 59-141878 | 8/1984 |
| CA | 2164608 | 12/1994 | JP | 60-061935 | 4/1985 |
| CA | 2312326 | 6/1999 | JP | 61-050470 | 3/1986 |
| CN | 1129879 | 8/1996 | JP | 61-074476 | 4/1986 |
| CN | 1164162 | 11/1997 | JP | 62-060370 | 3/1987 |
| CN | 1226030 | 8/1999 | JP | 62-060384 | 3/1987 |
| DE | 2918846 | 11/1980 | JP | 63-234679 | 9/1988 |
| DE | 3246225 | 6/1984 | JP | 01-307944 | 12/1989 |
| DE | 3337204 | 4/1985 | JP | 02-048879 | 2/1990 |
| DE | 3621263 | 1/1988 | JP | 03-063990 | 3/1991 |
| DE | 3909334 | 9/1990 | JP | 04-227380 | 8/1992 |
| DE | 4201031 | 7/1993 | JP | 04-335395 | 11/1992 |
| DE | 19531121 | 2/1997 | JP | 05-183826 | 7/1993 |
| DE | 3909334 | 2/1998 | JP | 05-284437 | 10/1993 |
| DE | 19740079 | 3/1999 | JP | 06-021907 | 1/1994 |
| DE | 19931046 | 1/2001 | JP | 07-020254 | 1/1995 |
| EP | 0 239 884 | 10/1987 | JP | 07-050259 | 2/1995 |
| EP | 0 337 336 | 10/1989 | JP | 07-076592 | 3/1995 |
| EP | 0 382 764 | 8/1990 | JP | 07-123326 | 5/1995 |
| EP | 0 396 062 | 11/1990 | JP | 07-147657 | 6/1995 |
| EP | 0 401 930 | 12/1990 | JP | 07-288759 | 10/1995 |
| EP | 0 408 892 | 1/1991 | JP | 07-321748 | 12/1995 |
| EP | 0 420 123 | 4/1991 | JP | 08-032528 | 2/1996 |
| EP | 0 424 648 | 5/1991 | JP | 08-032538 | 2/1996 |
| EP | 0 444 496 | 9/1991 | JP | 08-125497 | 5/1996 |
| EP | 0 447 968 | 9/1991 | JP | 08-251122 | 9/1996 |
| EP | 0 532 322 | 3/1993 | JP | 08-275077 | 10/1996 |
| EP | 0 550 911 | 7/1993 | JP | 09-037151 | 2/1997 |
| EP | 0 560 593 | 9/1993 | JP | 09-037168 | 2/1997 |
| EP | 0 572 090 | 12/1993 | JP | 09-037172 | 2/1997 |
| EP | 0 620 688 | 10/1994 | JP | 09-102827 | 4/1997 |
| EP | 0 624 039 | 11/1994 | JP | 10-143340 | 5/1998 |
| EP | 0 682 452 | 11/1995 | JP | 10-143349 | 5/1998 |
| EP | 0 721 253 | 7/1996 | JP | 10-512420 | 11/1998 |
| EP | 0 725 539 | 8/1996 | JP | 11-136615 | 5/1999 |
| EP | 0 752 767 | 1/1997 | JP | 11-313280 | 11/1999 |
| EP | 0 753 964 | 1/1997 | JP | 2001-213595 | 8/2001 |
| EP | 0 762 751 | 3/1997 | JP | 2002-279969 | 9/2002 |
| EP | 0 772 360 | 5/1997 | JP | 2004-007592 | 1/2004 |
| EP | 0 774 866 | 5/1997 | | | |

| | | | | | | |
|---|---|---|---|---|---|---|
| JP | 2004-023326 | 1/2004 | | WO | WO 97/19555 | 5/1997 |
| WO | WO 86/01359 | 2/1986 | | WO | WO 97/26612 | 7/1997 |
| WO | WO 86/01962 | 3/1986 | | WO | WO 97/28636 | 8/1997 |
| WO | WO 87/03766 | 6/1987 | | WO | WO 97/29458 | 8/1997 |
| WO | WO 88/04057 | 6/1988 | | WO | WO 97/31480 | 8/1997 |
| WO | WO 88/04507 | 6/1988 | | WO | WO 97/41673 | 11/1997 |
| WO | WO 89/02682 | 3/1989 | | WO | WO 97/42763 | 11/1997 |
| WO | WO 89/03085 | 4/1989 | | WO | WO 97/48230 | 12/1997 |
| WO | WO 89/12370 | 12/1989 | | WO | WO 97/49237 | 12/1997 |
| WO | WO 90/01243 | 2/1990 | | WO | WO 97/49241 | 12/1997 |
| WO | WO 90/15507 | 12/1990 | | WO | WO 97/49242 | 12/1997 |
| WO | WO 91/00670 | 1/1991 | | WO | WO 98/00975 | 1/1998 |
| WO | WO 91/05436 | 4/1991 | | WO | WO 98/00976 | 1/1998 |
| WO | WO 91/18476 | 11/1991 | | WO | WO 98/06219 | 2/1998 |
| WO | WO 92/04801 | 3/1992 | | WO | WO 98/10589 | 3/1998 |
| WO | WO 92/22983 | 12/1992 | | WO | WO 98/16062 | 4/1998 |
| WO | WO 93/04473 | 3/1993 | | WO | WO 98/17064 | 4/1998 |
| WO | WO 93/05452 | 3/1993 | | WO | WO 98/20675 | 5/1998 |
| WO | WO 93/11638 | 6/1993 | | WO | WO 98/26569 | 6/1998 |
| WO | WO 93/11639 | 6/1993 | | WO | WO 98/26584 | 6/1998 |
| WO | WO 93/11640 | 6/1993 | | WO | WO 98/27723 | 6/1998 |
| WO | WO 93/23957 | 11/1993 | | WO | WO 98/28906 | 7/1998 |
| WO | WO 94/13107 | 6/1994 | | WO | WO 98/31148 | 7/1998 |
| WO | WO 94/14281 | 6/1994 | | WO | WO 98/39893 | 9/1998 |
| WO | WO 94/14282 | 6/1994 | | WO | WO 98/41020 | 9/1998 |
| WO | WO 94/14283 | 6/1994 | | WO | WO 98/43183 | 10/1998 |
| WO | WO 94/14284 | 6/1994 | | WO | WO 98/47279 | 10/1998 |
| WO | WO 94/21085 | 9/1994 | | WO | WO 98/48566 | 10/1998 |
| WO | WO 94/23383 | 10/1994 | | WO | WO 98/51076 | 11/1998 |
| WO | WO 94/29811 | 12/1994 | | WO | WO 98/56172 | 12/1998 |
| WO | WO 95/01056 | 1/1995 | | WO | WO 98/59493 | 12/1998 |
| WO | WO 95/01057 | 1/1995 | | WO | WO 99/01984 | 1/1999 |
| WO | WO 95/01058 | 1/1995 | | WO | WO 99/04561 | 1/1999 |
| WO | WO 95/01059 | 1/1995 | | WO | WO 99/07142 | 2/1999 |
| WO | WO 95/06389 | 3/1995 | | WO | WO 99/14947 | 3/1999 |
| WO | WO 95/07003 | 3/1995 | | WO | WO 99/18722 | 4/1999 |
| WO | WO 95/10910 | 4/1995 | | WO | WO 99/29109 | 6/1999 |
| WO | WO 95/15649 | 6/1995 | | WO | WO 99/30491 | 6/1999 |
| WO | WO 95/15657 | 6/1995 | | WO | WO 99/31480 | 6/1999 |
| WO | WO 95/15658 | 6/1995 | | WO | WO 99/39280 | 8/1999 |
| WO | WO 95/16568 | 6/1995 | | WO | WO 99/45700 | 9/1999 |
| WO | WO 95/19092 | 7/1995 | | WO | WO 99/45701 | 9/1999 |
| WO | WO 95/26608 | 10/1995 | | WO | WO 99/45702 | 9/1999 |
| WO | WO 95/28055 | 10/1995 | | WO | WO 99/52279 | 10/1999 |
| WO | WO 95/28799 | 10/1995 | | WO | WO 99/52285 | 10/1999 |
| WO | WO 95/30961 | 11/1995 | | WO | WO 99/56466 | 11/1999 |
| WO | WO 95/31069 | 11/1995 | | WO | WO 99/56473 | 11/1999 |
| WO | WO 95/32583 | 11/1995 | | WO | WO 99/60783 | 11/1999 |
| WO | WO 95/32585 | 11/1995 | | WO | WO 99/60789 | 11/1999 |
| WO | WO 96/07270 | 3/1996 | | WO | WO 99/66725 | 12/1999 |
| WO | WO 96/08109 | 3/1996 | | WO | WO 00/02380 | 1/2000 |
| WO | WO 96/08113 | 3/1996 | | WO | WO 00/04706 | 1/2000 |
| WO | WO 96/09721 | 3/1996 | | WO | WO 00/04708 | 1/2000 |
| WO | WO 96/13932 | 5/1996 | | WO | WO 00/05889 | 2/2000 |
| WO | WO 96/13935 | 5/1996 | | WO | WO 00/07368 | 2/2000 |
| WO | WO 96/17467 | 6/1996 | | WO | WO 00/08852 | 2/2000 |
| WO | WO 96/17473 | 6/1996 | | WO | WO 00/08855 | 2/2000 |
| WO | WO 96/21990 | 7/1996 | | WO | WO 00/11865 | 3/2000 |
| WO | WO 96/26605 | 8/1996 | | WO | WO 00/11869 | 3/2000 |
| WO | WO 96/27270 | 9/1996 | | WO | WO 00/13415 | 3/2000 |
| WO | WO 96/27982 | 9/1996 | | WO | WO 00/16548 | 3/2000 |
| WO | WO 96/31980 | 10/1996 | | WO | WO 00/27122 | 5/2000 |
| WO | WO 96/34467 | 10/1996 | | WO | WO 00/28734 | 5/2000 |
| WO | WO 96/34486 | 10/1996 | | WO | WO 00/33160 | 6/2000 |
| WO | WO 96/34491 | 10/1996 | | WO | WO 00/33224 | 6/2000 |
| WO | WO 96/36172 | 11/1996 | | WO | WO 00/33560 | 6/2000 |
| WO | WO 96/37075 | 11/1996 | | WO | WO 00/33565 | 6/2000 |
| WO | WO 96/38799 | 12/1996 | | WO | WO 00/33573 | 6/2000 |
| WO | WO 96/41471 | 12/1996 | | WO | WO 00/49801 | 8/2000 |
| WO | WO 96/41477 | 12/1996 | | WO | WO 00/58833 | 10/2000 |
| WO | WO 96/41478 | 12/1996 | | WO | WO 00/58834 | 10/2000 |
| WO | WO 97/02702 | 1/1997 | | WO | WO 00/58967 | 10/2000 |
| WO | WO 97/03521 | 1/1997 | | WO | WO 00/59214 | 10/2000 |
| WO | WO 97/04595 | 2/1997 | | WO | WO 00/59223 | 10/2000 |
| WO | WO 97/07656 | 3/1997 | | WO | WO 00/62299 | 10/2000 |
| WO | WO 97/09699 | 3/1997 | | WO | WO 00/62533 | 10/2000 |
| WO | WO 97/13368 | 4/1997 | | WO | WO 00/67475 | 11/2000 |
| WO | WO 97/17774 | 5/1997 | | WO | WO 00/79798 | 12/2000 |
| WO | WO 97/18675 | 5/1997 | | WO | WO 01/01677 | 1/2001 |

| | | |
|---|---|---|
| WO | WO 01/06784 | 1/2001 |
| WO | WO 01/15438 | 3/2001 |
| WO | WO 01/19086 | 3/2001 |
| WO | WO 01/22729 | 3/2001 |
| WO | WO 01/35662 | 5/2001 |
| WO | WO 01/46843 | 6/2001 |
| WO | WO 01/46869 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/50743 | 7/2001 |
| WO | WO 01/58158 | 8/2001 |
| WO | WO 01/76239 | 10/2001 |
| WO | WO 01/89213 | 11/2001 |
| WO | WO 02/31731 | 4/2002 |
| WO | WO 02/084992 | 10/2002 |
| WO | WO 03/019932 | 3/2003 |
| WO | WO 03/058537 | 7/2003 |
| WO | WO 2004/063892 | 7/2004 |
| WO | WO 2004/095426 | 11/2004 |

OTHER PUBLICATIONS

"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.
Creation-Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Dial M for Movie", Funkschau 11-94 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
"'Duck Tales,'(1987)[TV Series 1987-1990]," Internet Movie Database (IMDB) [Retrieved on Apr. 7, 2007].
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http://www.atvef.com/library/spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987 (Unknown author).
"Getting Started" Installation Guide, "Using StarSight 1" Manual, and Remote Control "Quick Reference Guide", copyright 1994.
"Honey, is there anything good on the remote tonight?" Multichannel News, Broadband Week Section, Nov. 30, 1998, p. 168.
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
James Sorce, David Fay, Brian Raila and Robert Virzi, "Designing a Broadband Residential Entertainment Service: A Case Study," GTE Laboratories Incorporated, undated, pp. 141-148.
"Lists> What's on Tonite! TV Listings (fwd)," Internet article (On line), Jan. 28, 1995, XP 002378869 [Retrieved on Apr. 28, 2006].

"MSI Datacasting Systems," TV Communications Journal, Jan. 1973.
"Open TV(R) and Interactive Channel Form Stratgic Alliance to Deliver Interactive Programming to Satellite Television Subscribers", printed from internet Jun. 28, 1999.
"Open TV Launches OpenStreamer™ Technology for Broadcasters to Deliver First Ever Real-Time Digital Interactive Television," from the internet at http://ww.opentv.com/news/openstreamer_press_final.htm, printed on Jun. 28, 1999, the document bears a copyright date of 1999.
"Prevue Networks and OpenTV(R) Agree to Work Together on Deploying Interactive Program Guides Worldwide," from the internet at http://www.opentv.com/news/prevuefinal.htm, printed on Jun. 28, 1999.
"Probe XL Brochure, Auto Tote Systems Inc.," (Newark, Delaware) (undated) 57 pgs.
"Rewind, reply and unwind with new high-tech TV devices," by Lawrence J. Magid, LA Times. This document was printed from the internet on Jun. 6, 1999 and bears a date of May 19, 1999.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
"TV Listings Functional Spec.," Time Video Information Services, Inc., undated.
"Using StarSight 2," Instruction Manual, StarSight Telecast, Inc., Starsight CB 1500 Customer Letter, 1994.
"Windows 98 Feature Combines TV, Terminal and the Internet," New York Times, Aug. 18, 1998.
"Open TV fur interaktives Fernsehen," Trend and Technik, Sep. 1995 RFE, p. 100. (English language translation attached).
"Prodigy Launches Interactive TV Listing", Apr. 22, 1994 public Broadcasting Report.
"StarSight Interactive Television Program Guide III" Jim Leftwich and Steve Schein, Functional-Interactional Architecture Specification Document, Orbit Interaction, Palo alto, California, Published before Apr. 19, 1995.
"StarSight Interactive Television Program Guide" Jim Leftwich, Willy Lai & Steve Schein Published before Apr. 19, 1995.
"TV Guide Online Set for Fall", Entertainment Marketing Letter, Aug. 1994.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Applebaum. Sun's Next Steps in Digital Set-tops, Cablevision, Nov. 16, 1998.
Bach, U. et al., "Multimedia TV Set, Part 1" Radio-Fernsehen Elektronik (RFE), Sep. 1996, pp. 28, 30, 31. (English language translation attached.).
Bach, U. et al., "Multimedia TV Set, Part 2 and Conclusion," Radio-Fernsehen Elektronik (RFE), Oct. 1996, pp. 38-40. (English language translation attached.).
Baer, R.H, "Innovative Add-On TV Products," IEEE Transactions on Consumer Electronics, vol. CE-25, Nov. 1979, pp. 765-771.
Baer, Tele-Briefs. A Novel User-Selectable Real Time News Headline Service for Cable TV, IEEE Transaction on Consumer Electronics CE-25(3):406-408 (1979).
Bensch, U., "VPV Videotext Programs Videorecorder," IEEE Paper, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Brochure, "A New Approach to Addressability," CableData, undated.
Brochure, "Westar and Videotoken Network Present the CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, On Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiff's Exhibit 289).
CableData, Roseville Consumer Presentation, Mar. 1985.
Carne, E.B., "The Wired Household," IEEE Spectrum, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Cox, J. et al, "Extended Services in a Digital Compression System," Proceedings from Eleven Technical Sessions: 42nd Annual Convention and Exposition of the National Cable Television Association, Jun. 1993, pp. 185-191.
Damouny, N. G., "Teletext Decoders—Keeping Up With the Latest Advances," IEEE Transactions on Consumer Electronics, vol. CE-30, No. 3, Aug. 1984, pp. 429-435.
Declaration Under 37 C.F.R. § 1.132 of Richard E. Glassberg, signed Oct. 20, 2006, filed Oct. 24, 2006, from U.S. Appl. No. 10/346,266.
DiRosa, S. "BIGSURF Netguide", Jul. 1995, vol. 3.1 (Sections 18,21, and 28—renumbered as pp. 1-27).
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations-und Datenangebote beim digitalen Femsehen—EPG Und 'Lesezeichen'," RTM Rundfunktechnische Mitteilungen, Jun. 1997, vol. 41, pp. 67-72.
European Search Report dated Nov. 19, 2002 from European Application No. 98944611.7.
European Telecommunication Standard, "Electronic Programme Guide (EPG); Protocol for a TV Guide using electronic data transmission," pp. 1-45, sections 1-11.12.7 and annex A-P, bearing a date of May 1997.
Gondow et al, The Architecture of Communication Migration and Media State Management for Distributed Applications on Wearable Networks, Information Processing of Japan 61st National Conference (2000).
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
How Evolve Works, vww.evolveproducts.com-network.html, printed from the internet on Dec. 28, 1998.

Index Systems Inc., Gemstar Service Object Model, Version 2.0.4, 2002.
Instructional Manual, "Sonic the Hedgehog," Sega of America, 1992.
International Search Report and Written Opinion of the International Searching Authority of counterpart application No. PCT/US2007/025094 mailed May 30, 2008.
Jaidev, XSLT—A Wired and Wireless Case Study, XML in Wireless Applications, Oct. 14, 2005, http://csharpcomputing.com/XMLTutorial/Lesson15.htm.
James, A., "Oracle—Broadcasting the Written Word," Wireless World, Jul. 1973, vol. 79 No. 1453, pp. 314-316.
Judice, C.N., "Move Over Cable, Here Comes Video Via Voice Lines," Network World, Sep. 1986, p. 26.
Kai et al "Development of a Simulation System for Integrated Services Television," Report from Information Processing Society of Japan, Japan, Sep. 13, 1996, vol. 96, No. 90 pgs.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiff's Exhibit 298).
Listing of computer code for Video HTU Program (Plaintiff's Exhibit 299), 1995.
Lowenstein, R.L. and Aller, H.E., "The Inevitable March of Videotex," Technology Review, vol. 88, Oct. 1985, p. 22.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
M-A-COM, Inc., "Videocipher II Satellite Descrambler Owner's Manual," dated Prior Feb. 1986, pp. 1-17.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell,R.G., "Tac Timer," 1986 NCTA Technical Papers, pp. 203-206.
Miller, Matthew D., "A Scenario for the Deployment of Interactive Multimedia Cable Television Systems in the United States in the 1990's", proceedings of the IEEE, vol. 82, No. 4, Apr. 1994, pp. 585-589.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Pfister, Larry T., "Teletext: Its Time Has Come," Prepared for the IGC Videotext—Teletext Conference, Andover, Massachusetts, Dec. 14, 1982, pp. 1-11.
Pogue, State of the Art; For TiVo and Replay, New Reach, May 29, 2003.
Prevue Guide Brochure, Spring 1994.
Randerson, Let software catch the same for you, New Scientist Breaking News, Jul. 3, 2004, http://www.newscientist.com/article.ns?id=dn6097.
Rayers, D.J., "Telesoftware by Teletext," 1984 IEEE Conference Papers, vol. 240, p. 323.
Reaching your subscribers is a complex and costly process—until now, http://www.evolveproducts.com/info.html, undated.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.

Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland Dec. 15, 1994, 1 pg.
Schlender, B.R., "Couch Potatoes! Now It's Smart TV," Fortune, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic, Dec. 1984.
Sunada, K. et al, "Teletext Color Television Receiver Model C-29M950, C26M940," NEC Home Electronics, NEC Giho, 1987.
Sussman, A. "GTE Tunes in to Home TV Shopping," PC Week, Jun. 28, 1988, p. C15.
Tech Notes: Product Updates from M-A-COM Cable Home Group, "Videocipher Owner's Manual Update," Issue No. 6, Feb. 1986.
Technical White Paper, "Open Tv™ Operating Environment," (© 1998 OpenTV Inc.), pp. 1-12.
The Evolve EZ Guide. The Remote Controller. http://www.evolveproducts.com/display2.html, (undated).
Transcript of the Deposition of John Roop, Oct. 1996, pp. 186-187.
Trial testimony of Michael Axford, *Prevue Interactive, Inc. and United Video Satellite Group, Inc.* v. *Starsight Telecast, Inc.*, May 9, 1998, pp. 186-187, 295-315, and 352-357.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "VideoGuide User's Manual," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Waldo, Jini™ Architecture Overview, http://java.sun.com/products/jini/whitepapers/architectureoverview.pdf, printed Jan. 25, 1999.
What is Jini? http://java.sun.com/products/jini/whitepapers/whatsjini.pdf, printed Jan. 25, 1999.
Why Jini Now? http://java.sun.com-products/jini/whitepapers/whyjininow.pdf, printed Jan. 25, 1999.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al, "An Open-Systems Approach to Video on Demand," IEEE Communications Magazine, May 1994, pp. 68-80.
"Verknüpfung von TV mit Internet," Forschung & Entwicklung, vol. 68, No. 18, Aug. 16, 1996, pp. 70-71, XP000631189.

* cited by examiner

SYSTEMS AND METHODS FOR AUTOMATICALLY GENERATING ADVERTISEMENTS USING A MEDIA GUIDANCE APPLICATION

BACKGROUND OF THE INVENTION

This invention relates generally to interactive media guidance applications, and more particularly, to automatic advertisement generation using an interactive media guidance application.

With the increasing use of interactive program guides and other media guidance applications, advertisements shown within such applications have become an important promotional tool. Advertisements, for example, may promote future media programs, ongoing television series, and pay-per-view programming, in hopes of attracting more viewers to these programs. Advertisements may also promote products and services unrelated to television programs, such as automobiles or food products. In some media guidance applications, multiple advertising display opportunities may be available simultaneously. For example, a number of advertisement display regions located within various display screens of the application may be available for presenting advertisements to a user.

In conventional interactive television application systems, advertisement display regions are filled with advertisements provided by a remote server or other remote advertisement source. These advertisements may be delivered to user equipment and stored for future display. However, suitable stored advertisements are not always available to fill all available advertisement display regions. Typically, these advertisement display regions remain unfilled or are filled with placeholder advertisements.

Accordingly, it would be desirable to have a systematic approach for filling all available advertising display opportunities within a media guidance application.

SUMMARY OF THE INVENTION

In view of the foregoing, systems and methods for automatically generating advertisements using a media guidance application are provided. A media guidance application display screen that includes an advertisement display region may be displayed, and advertisement criteria, including advertisement content and advertisement composition, may be identified for the advertisement display region. Advertisement elements from an advertisement database may be retrieved in accordance with the identified advertisement criteria. Then, a new advertisement may be generated for display in the advertisement display region using the plurality of advertisement elements, and the generated advertisement may be displayed in the advertisement display region. In some embodiments, data describing the generated advertisement is transmitted to at least one remote data-collection server.

In one approach, the advertisement database is searched for a stored advertisement assigned to the advertisement display region before advertisement criteria is identified. In another approach, the advertisement database is searched for a stored advertisement that satisfies criteria associated with the advertisement display region before advertisement criteria is identified. The criteria associated with the advertisement display region may be display size, display location, priority designation, and/or advertisement type. In either approach, identifying advertisement criteria is then performed in response to determining that the advertisement database does not include a suitable stored advertisement.

The advertisement criteria may include a product, a service, a promotion, an advertiser, user interests, user viewing habits, user interaction with other advertisements, user interaction with the media guidance application, user demographic data, target display screen properties, availability of advertisement elements, display size, display location, and/or stylistic specifications. The advertisement elements may include text, graphics, video, and/or audio.

In some embodiments, an advertisement template is retrieved and a new advertisement may be generated by inserting the advertisement elements into predefined regions within the advertisement template. Media elements may also be specified to be displayed or played in response to a user action.

In some embodiments, the generated advertisement is stored and/or transmitted to a remote data-collection server. In other embodiments, user interaction with the generated advertisement is monitored to produce user interaction data, which is included in the data describing the generated advertisement. It may then be determined, based on the user interaction data, that the generated advertisement has attracted a predetermined amount of user interaction and, in response, the generated advertisement may be transmitted to a remote data-collection server.

In one example, an advertisement database may be searched to identify a stored advertisement suitable for display in an advertisement display region of a media guidance application display screen. Upon determining that the advertisement database does not include such a stored advertisement, a new advertisement may be generated for display in the advertisement display region using advertisement elements from an advertisement database. The advertisement elements may be selected in accordance with identified advertisement criteria.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
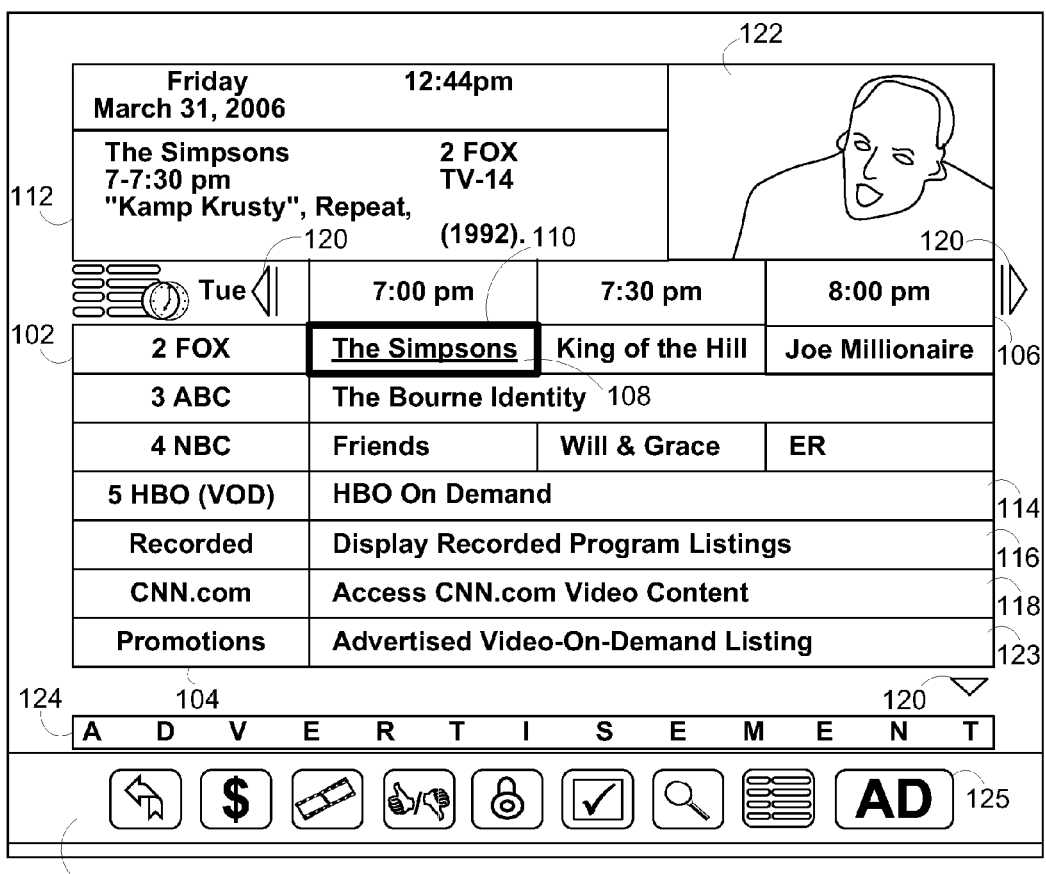
FIG. 1 shows an illustrative display screen using a grid format that may be used to provide guidance for various types of media in accordance with an embodiment of the invention.

The amount of media available to users in any given media delivery system may be substantial. Consequently, many users desire a form of media guidance through an interface that allows users to efficiently navigate through media selections and easily identify media content that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactive content forms. Multimedia content may be recorded and played, displayed, or accessed by information content processing devices, such as computerized and electronic devices, but may also be part of a live performance. It should be understood that the invention embodiments that are described in relation to media or media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
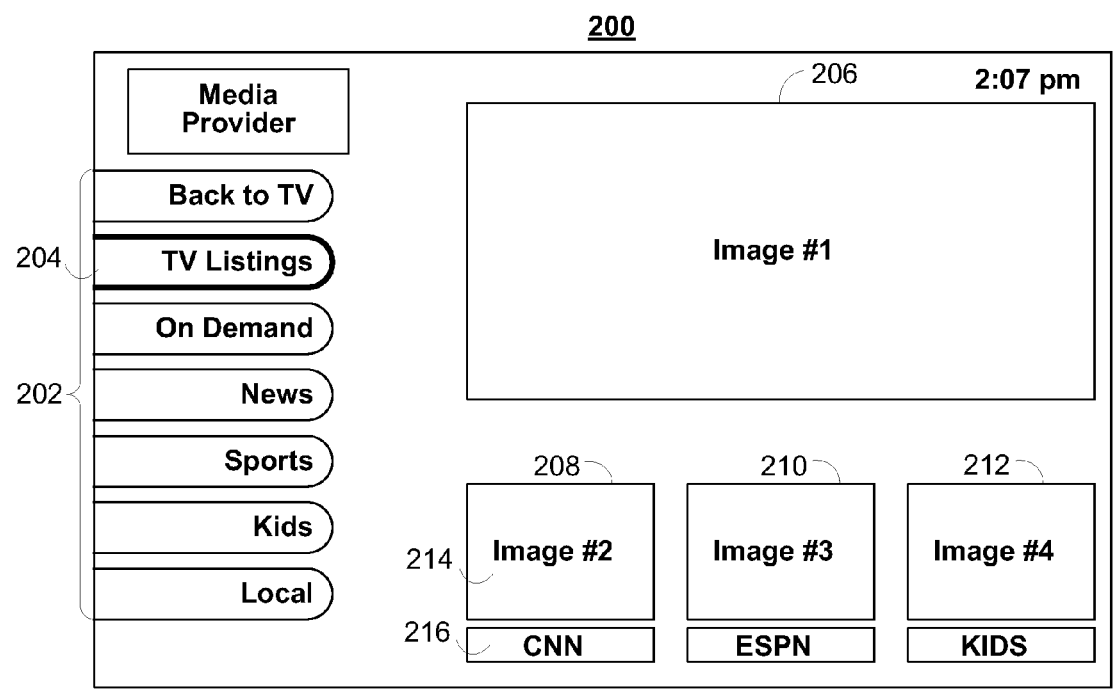
FIG. 2 shows an illustrative display screen using a mosaic that may be used to provide guidance for various types of media in accordance with an embodiment of the invention.

One of the functions of the media guidance application is to provide media listings and media information to users. FIGS. 1 and 2 show illustrative display screens that may be used to provide media guidance, and in particular media listings. The display screens shown in FIGS. 1 and 2 may be implemented on any suitable device or platform. As defined herein, platform refers to any system that may support the operation of an interactive media guidance application. While the display screens of FIGS. 1 and 2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display screen 100 arranged by time and channel that also enables access to different types of media content in a single display. Display screen 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user may select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display screen 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120).

Display screen 100 may also include video region 122 and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Options region 126 may allow the user to access different types of media content, media guidance application displays, and/or media guidance application features. Options region 126 may be part of display screen 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

Display screen 100 may also include advertisement display regions 123, 124, and 125 within which advertisements are displayed. Advertisement display regions (and the advertisements displayed therein) may be any suitable size or shape, and may be located or embedded anywhere within, or overlaid anywhere on top of, a display screen of the media guidance application. For example, display screen 100 may include advertisement display region 123 within the listings of grid 102. As another example, display screen 100 may include advertisement display region 125 within options region 126. As yet another example, while advertisement display region 124 is shown as rectangular or banner shaped (i.e., a panel advertisement) that is horizontally adjacent to grid 102, it may otherwise be circular and/or vertically positioned. The horizontal or vertical positioning of an advertisement display region (or advertisement) may also be referred to herein as orientation.

Advertisements may display information on linear or non-linear programming. In some embodiments, advertisement display regions 123, 124, and 125 display advertisements for media content that, depending on a viewer's access rights (e.g., for subscription programming), is currently available for viewing, will be available for viewing in the future, or may never become available for viewing, and may correspond to or be unrelated to one or more of the media listings in grid 102. In other embodiments, advertisement display regions 123, 124, and 125 display advertisements for products or services related or unrelated to the media content displayed in grid 102. Advertisements displayed within advertisement display regions 123, 124, and 125 may be targeted based on a user's profile/preferences, monitored user activity, the type of display provided, or on other suitable targeted advertisement bases, as described below in connection with FIG. 7. Advertisement display regions 123, 124, and 125, or the advertisements displayed therein, may be selectable and provide further information about media content, provide information about a product or a service, enable purchasing of media content, a product, or a service, provide media content relating to the advertisement, etc. Generally, advertisements may include text, images, rotating images, video clips, other types of media content, or a combination thereof.

With a user input device, a user may select advertisements or advertisement display regions (e.g., regions 123, 124, and 125) by moving highlight region 110. Information relating to the advertisement selected by highlight region 110 may be provided in program information region 112. Region 112 may include, for example, the advertisement's sponsor, an advertisement description, purchase information, or other desired information. In embodiments in which the advertisement displays program information, region 112 may include any information relating to the program, such as the program title, the program description, the time the program is provided (if applicable), the channel the program is on (if applicable), the program cost (if applicable), the program's rating, and other desired information. Instead of region 112, in some embodiments, information relating to the advertisement selected by highlight region 110 may be provided in an overlay region over other media content displayed in display screen 100. In addition, the content of video region 122 may correspond to, or be independent from, one of the advertisements displayed and/or selected in display screen 100.

Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, I I I et al. U.S. Pat. No. 6,756,997, issued Jun. 29, 2004, and Schein et al. U.S. Pat. No. 6,388,714, issued May 14, 2002, which are hereby incorporated by reference herein in their entireties. Upon loading or displaying a display screen (e.g., display screen 100), the media guidance application may search the aforementioned storage locations for advertisements to fill the available advertisement display regions (e.g., advertisement display regions 123, 124, and 125). In some embodiments, the media guidance application may generate new advertisements to fill some or all of the available advertisement display regions. For example, the media guidance application may generate new advertisements upon determining that the storage locations do not contain suitable stored advertisements to fill all the available advertisement display regions. Searching for stored advertisements, identifying suitable stored advertisements, and generating new advertisements are all discussed in greater detail below (e.g., with respect to FIGS. 7-10). It will be appreciated that advertisements may be included in advertisement display regions of other media guidance application display screens of the present invention. In addition, it will be appreciated that media guidance application display screens may include any number of advertisement display regions.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile, which may be customized for each user who will be interacting with the media guidance application. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the media guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user may be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al. U.S. Pat. No. 7,165,098, issued Jan. 16, 2007, and Ellis et al., U.S. patent application Ser. No. 10/105,128, filed Feb. 21, 2002, which are hereby incorporated by reference herein in their entireties.

In some embodiments, the media guidance application may be personalized in accordance with an advertisement or advertisement criteria. In particular, the media guidance application display screens and other media guidance features may be customized such that the appearance and/or functionalities of display elements are identifiably linked to an advertiser and/or advertised product, service, or other promotion. The customizations may include varying presentation schemes (e.g., color scheme of displays, font size of text, etc.), aspects of media content listings displayed (e.g., only advertiser sponsored programming, re-ordering the display of channels, recommended media content, etc.), and other desired customizations. For example, a media guidance display screen, a region within a display screen, or an overlay region may be wrapped in a customized graphic. As another example, the background image of a media guidance display screen, a region within the display screen, or an overlay region may be customized. Moreover, these display screens and regions may be considered advertisement display regions and filled with appropriate advertisements (e.g., stored or generated advertisements) using any of the techniques and features discussed below.

Further customizations may be made to enhance program listings in accordance with advertisement criteria. For example, the media guidance application may modify distinct elements within a listing (e.g., a listing's title, description, or other fields) in order to emphasize or deemphasize certain ones of the elements (e.g., the elements may be highlighted, shaded, colored, or otherwise enhanced). In some embodiments, a media guidance display screen, or a region containing the listings, may be wrapped in a customized graphic, for example, upon selection of a particular listing. Listings enhancements may be performed at least partially based on user profile information. Program listing enhancement features are described in greater detail in co-pending U.S. patent application Ser. No. 12/571,011, filed Sep. 30, 2009, which is hereby incorporated by reference herein in its entirety.

Another display arrangement for providing media guidance is shown in FIG. 2. Video mosaic display screen 200 includes selectable options 202 for media content information organized based on media type, genre, and/or other organization criteria. In display screen 200, television listings option 204 is selected, thus providing listings 206, 208, 210, and 212 as broadcast program listings. Unlike the listings from FIG. 1, the listings in display screen 200 are not limited to simple text (e.g., the program title) and icons to describe media. Rather, in display screen 200 the listings may provide graphical images including cover art, still images from the media content, video clip previews, live video from the media content, advertisements, or other types of media that indicate to a user the media content being described by the listing. Each of the graphical listings may also be accompanied by text to provide further information about the media content associated with the listing. For example, listing 208 may include more than one region, including media region 214 and text region 216. Media region 214 and/or text region 216 may be selectable to view video in full-screen or to view program listings related to the video displayed in media region 214 (e.g., to view listings for the channel that the video is displayed on).

The listings in display screen 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety. Although not shown, it will be appreciated that display screen 200, like display screen 100, may include any number of advertisement display regions.

Figure 3:
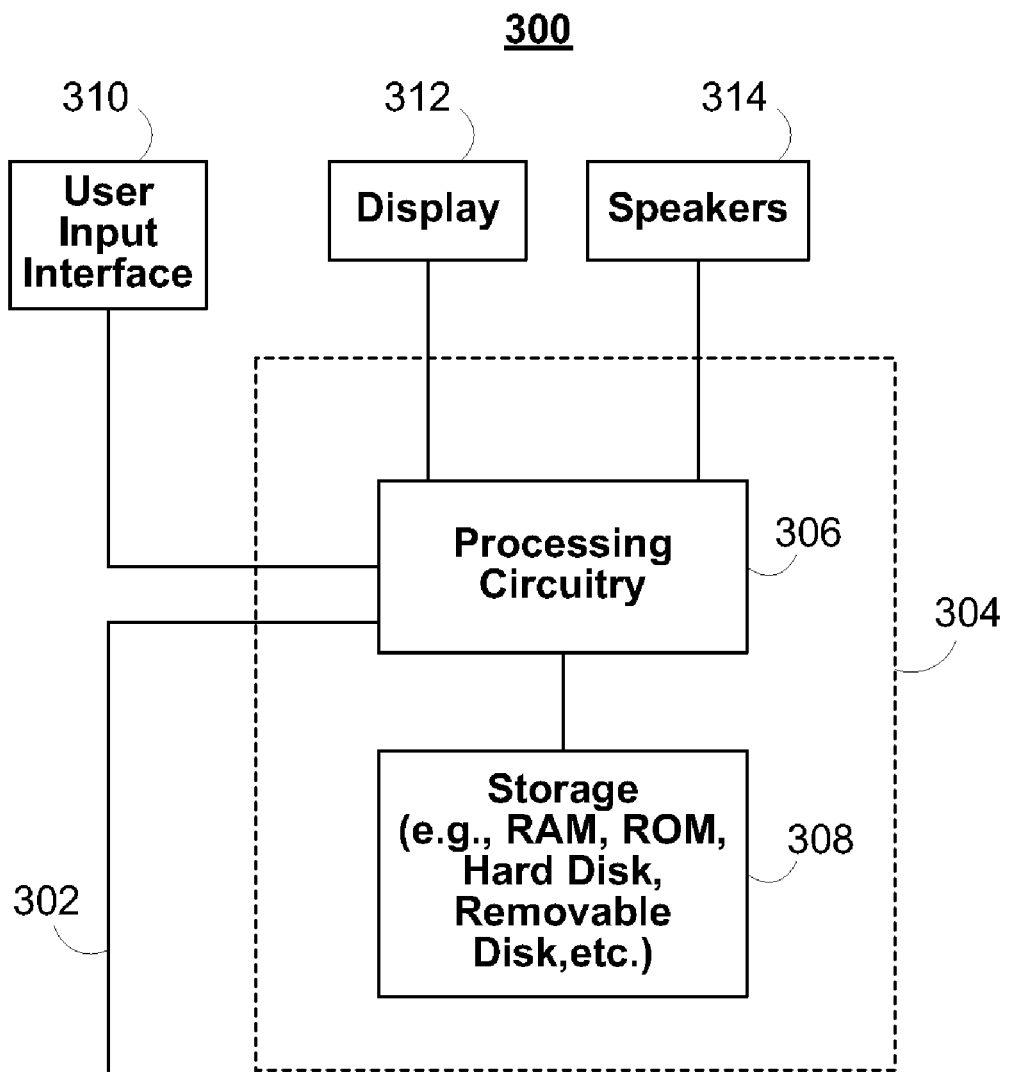
FIG. 3 shows an illustrative user equipment device in accordance with an embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 6. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308.

Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
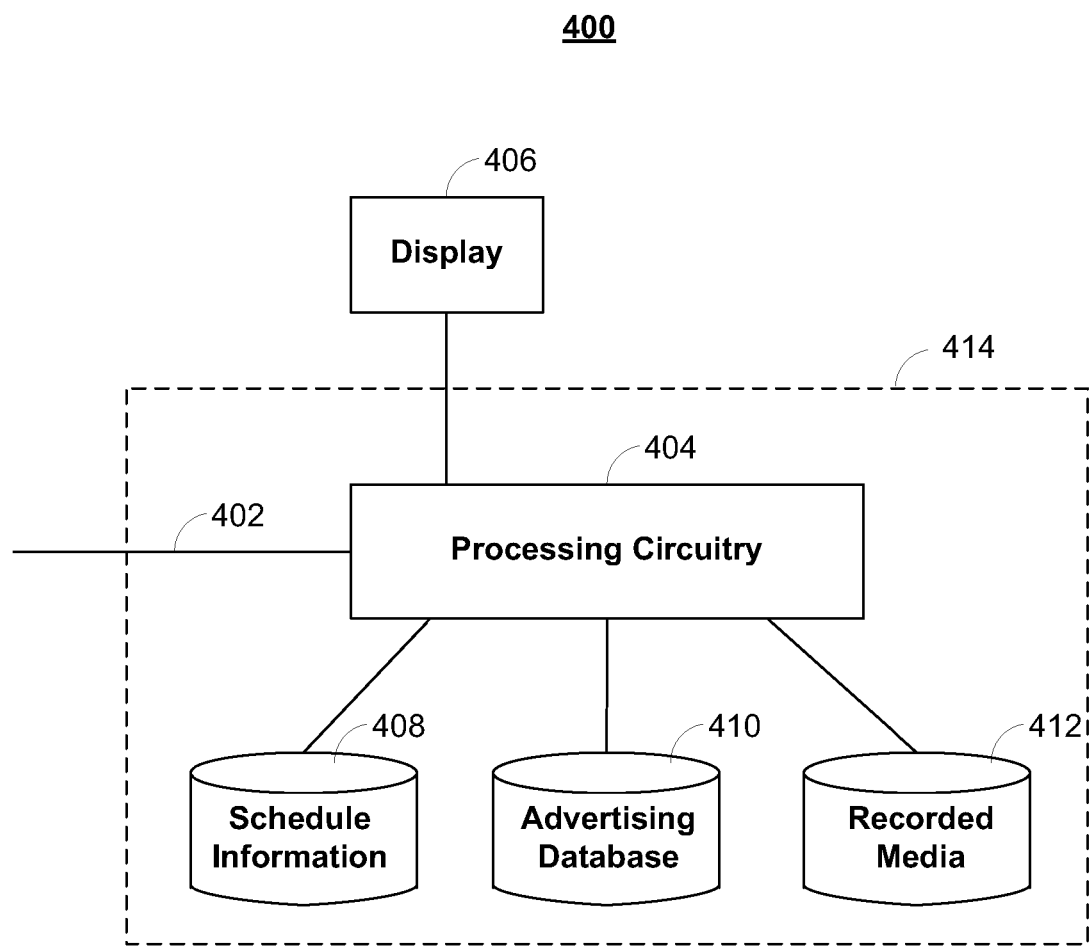
FIG. 4 shows a simplified diagram of an illustrative interactive media system in accordance with an embodiment of the invention.

Referring now to FIG. 4, illustrative user equipment device 400 is shown in accordance with an embodiment of the invention. User equipment device 400 is a more detailed, yet still simplified, view of user equipment device 300 of FIG. 3. In addition to the features and functionalities described below, user equipment device 400 may include any of the components, features, and functionalities described above in connection with FIG. 3. Control circuitry 414 of user equipment device 400 may include processing circuitry 404, schedule information data store 408, advertising data store 410, and recorded media data store 412. Data stores 408, 410, and 412 may each be one or more relational databases or any other suitable storage mechanisms. Although data stores 408, 410, and 412 are shown as separate data stores, one or more of these data stores may instead be combined into a single storage system. Although only data stores 408, 410, and 412 are shown in FIG. 4, it will be understood that there may be any suitable number of data stores. For example, in some embodiments, there may be a user profile data store (not pictured) that may be dedicated to storing user profile information.

Schedule information data store 408 may store media guidance data for a media guidance application. Schedule information data store 408 may store media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), on-demand information, or any other suitable information. The schedule information included in schedule information data store 408 may be used by the media guidance application to provide a program guide display (e.g., display screens 100 and 200 of FIGS. 1 and 2, respectively) on display 406, or to provide any other suitable media guidance display screen.

With continuing reference to FIG. 4, advertising data store 410 may store advertising content for display in a media guidance application. Advertising content may include advertisements transmitted to, or retrieved by, the user equipment. Advertising content may also include advertisements automatically generated at the user equipment. Advertising data store 410 may store advertising content in various forms, including text, graphics, images, video clips, content of any other suitable type, or references to remotely stored content. Data store 410 may also store links or identifiers to advertising content in other data stores. In some embodiments, data store 410 may store indexes for advertising content in other local data stores (e.g., data store 408 or 412), or may store identifiers to remote storage systems, such as URLs to advertisements provided by web servers. Data store 410 may also store identifying information associated with the advertising content (e.g., advertiser, type of advertisement, length of advertisement, advertisement display properties, advertisement subject matter, etc.), or may store indexes to locations in other local or remote storage systems where this information may be found.

As discussed above, and described in detail further below, the media guidance application may be configured to generate new advertisements. In these embodiments, advertising data store 410 may store information pertaining to advertisement generation and/or the generated advertisements themselves. In some embodiments, data store 410 may include data and/or media elements required for advertisement generation. In particular, data store 410 may include criteria for determining the composition and content of a new advertisement, as described in greater detail below in connection with step 902 of FIG. 9. For example, data store 410 may include a list of products or services to feature in a new advertisement. As another example, data store 410 may include, stylistic specifications for new advertisements, including color scheme, font, layout, and formatting information. Data store 410 may also include advertisement elements used for advertisement creation. Advertisement elements are media objects that may be used to create an advertisement, such as text, graphics, video, audio, and links. For example, an advertisement element may be a logo, a picture or illustration (e.g., of a product or service), a program listing, a video clip, or a link to a product web site. As another example, an advertisement element may be an interactive element, such as a button, text field, menu, etc. In addition, data store 410 may include metadata or other descriptive information associated with the advertisement elements (e.g., data describing the element type and/or information identifying a company, organization, product, or service associated with the advertisement element). For example, a graphic of a logo may be associated with data identifying the graphic as a logo for a particular company. Data store 410 may also include a list of related advertisement elements, or, as described below in connection with FIG. 5, data store 410 may include data structures associated with the advertisement elements that include indices linking related advertisement elements together.

In some embodiments, data store 410 may include advertisement templates used to generate new advertisements in accordance with a predefined design, as described in greater detail below in connection with step 904 of FIG. 9. Data store 410 may include a number of templates customized for use with different advertisement display regions or for different types of advertising content (e.g., based on the advertiser or the product, service, or promotion being advertised). For example, data store 410 may include templates of different shapes, sizes, color schemes, fonts, or other styles, and/or templates containing different numbers of regions for displaying advertisement elements.

In some embodiments, data store 410 may include data and/or media elements included in or associated with a particular generated advertisement. The generated advertisement may have been generated locally (i.e., at the user equipment), or remotely (e.g., at an advertisement server or other user equipment). In particular, data store 410 may include information describing the advertisement generation process, the content of the generated advertisement, or any other suitable information pertaining to the generated advertisement. For example, data store 410 may include information on the product, service, or promotion advertised in the generated advertisement. Data store 410 may also include information on the types of elements selected to create the generated advertisement, how the elements were arranged, the stylistic properties of the generated advertisement, and other suitable data describing the attributes of the generated advertisement. The stored data may include all information necessary to recreate the generated advertisement, and may include the advertisement elements (and associated metadata) contained within the advertisement.

Advertising data store 410 may also store information pertaining to the number of times various advertisements (stored or generated) have been displayed in the media guidance application (i.e., number of impressions). In some embodiments, advertising data store 410 may store information pertaining to user interaction with the various advertisements. In particular, advertising data store 410 may record the number of times the advertisements are clicked or otherwise selected. Advertising data store 410 may also store information on the past display history of the advertisements, such as which display screens of the media guidance application displayed the advertisement, which particular advertisement display regions within the display screens contained the advertisements, or the times the advertisements were displayed. In addition, any of the information stored in advertising data store 410 may be combined, cross-referenced, or correlated. Such combined, cross-referenced, or correlated information may be helpful in determining optimal advertisement selection and placement by, for example, providing information on which advertisements receive the most clicks on different display screens. Other information that may be included in advertising data store 410 is discussed below in connection with FIGS. 5 and 9.

With continuing reference to FIG. 4, recorded media data store 412 may store recorded media or information related to recorded media accessible through a media guidance application. In particular, recorded media data store 412 may store media content or information about media content locally recorded (e.g., video content recorded using a DVR, DVD recorder, etc.) or available remotely (e.g., video content stored on a remote server and available through download, streaming, etc.). The contents of recorded media data store 412 may include media in various forms, including text, graphics, images, video clips, content of any other suitable type, or references to remotely stored content. Recorded media data store 412 may also store links or identifiers to media content in other data stores. In some embodiments, recorded media data store 412 may store indexes for media content in other local data stores (e.g., data store 408 or 410), or may store identifiers to remote storage systems, such as URLs to media provided by web servers.

Recorded media data store 412 may also store identifying information about each media element stored therein. For example, data store 412 may include the type, format, title, description, genre, or category of the media. As another example, recorded media data store 412 may include the display properties of the media, a television program, logo, advertiser, advertisement, or product with which the media is associated, or any other suitable information. Data store 412 may also (or alternatively) store indexes to locations in other local or remote storage systems where this information may be found.

With continuing reference to FIG. 4, processing circuitry 404, which may have any of the features and functionalities of processing circuitry 306 (FIG. 3), may access any of the information included in data stores 408, 410 and 412. Processing circuitry 404 may use this information to select, prepare, and display information on display 406. In particular, processing circuitry 404 may use information obtained from these data stores to provide, generate, and/or display advertisements to a user of user equipment 400. In addition, processing circuitry 404 may update information in data stores 408, 410 and 412 with data received from, for example, communications link 402. Communications link 402 may have any of the features and functionalities of communications links 608, 610, and 612 of FIG. 6, discussed in greater detail below. In some embodiments, processing circuitry 404 may update schedule information in data store 408 with new or updated information, may add, remove, or change any advertising content in data store 410, and may add, remove, or change recorded media or information associated with recorded media in data store 412 or any other suitable data store. Processing circuitry 404 may additionally update any of the associations between these data stores (e.g., between a scheduled broadcast and its associated advertisement).

Figure 5:
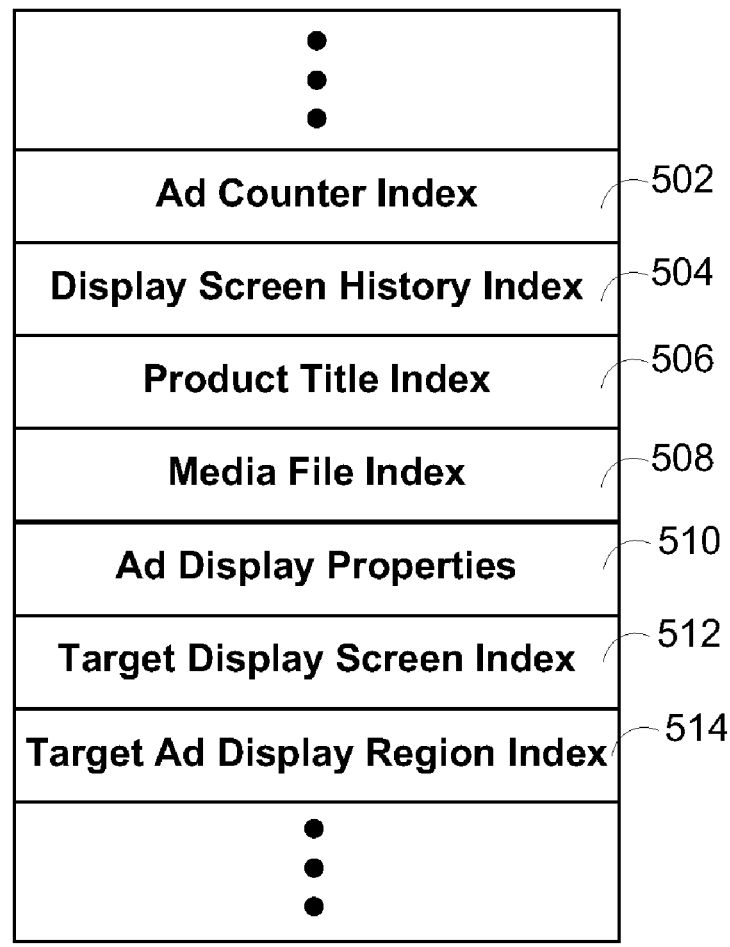
FIG. 5 shows an illustrative diagram of an advertising data structure in accordance with an embodiment of the invention.

FIG. 5 shows illustrative data structure 500 for storing an advertisement in accordance with an embodiment of the present invention. Data structure 500 may be transmitted to, or retrieved by, user equipment. Alternatively, data structure 500 may be generated locally at user equipment, for example, when a new advertisement is generated by the media guidance application. A plurality of data structures similar to data structure 500 may be used for structuring the storage of advertisements in an advertising storage system, such as advertising data store 410 of FIG. 4.

Data structure 500 may include space for storing ad counter index 502, display screen history index 504, product title index 506, media file index 508, ad display properties 510, target display screen index 512, and target ad display region index 514. Media file index 508 may be a link to one or more media files (e.g., text, image, or video files) located in a suitable storage location, such as storage 308 of FIG. 3 or another location. This media file may be displayed to a user as a banner, panel, channel/embedded, or overlay advertisement in a media guidance application. For example, media file index 508 may link to a bitmap image including text or graphics that may be displayed as an advertisement within advertisement display region 124 of FIG. 1. Although only one media file index is shown, there may be multiple indexes if an advertisement is comprised of multiple media files. Also, the advertisements may be comprised of different media files in any suitable format. For example, advertisements may be stored as text (e.g., ASCII) and converted to an image by suitable processing circuitry, such as an image generator. As another example, an advertisement may combine text and video, stored separately, and link both to the advertisement via media file index 508.

Product title index 506 of data structure 500 may be used to associate an advertisement with particular products, services, promotions, media content, or any combination thereof. For example, product title index 506 may associate an advertisement with a particular television series or episode, or with a particular product displayed in a particular television program. Product title index 506 may link the advertisement to another location in advertising data store 410 of FIG. 4, or to a location in another data structure or another data store (e.g., schedule information data store 408 or recorded media information data store 412 of FIG. 4) where information about that media content is stored. If the advertisement promotes a future or ongoing program, the associated media content may be the program that the advertisement is promoting. For example, product title index 506 may link to a database storing the title, "South Park," to associate that television series with an advertisement. If the entry for South Park includes other information (or indexes to other information) about South Park, product title index 506 may indirectly be used to determine the other information about the media content being advertised. In this way, the type of media content (e.g., genre, rating, etc.) of a program may be determined, or any other suitable information may be determined using this link. Although the example of FIG. 5 shows that data structure 500 is linked to information by product title, this is merely illustrative. The advertisement may alternatively be linked to information about products, services, promotions, or media content using any suitable index, link, or descriptive indicator.

Data structure 500 of FIG. 5 may also include space to store target display screen index 512. Target display screen index 512 may link an advertisement to a target media guidance display screen, such that the advertisement is displayed each time the user accesses the target display screen. In some embodiments, the advertisement may be linked to a target media guidance display screen (e.g., by control circuitry 304 of FIG. 3) in response to a user action, such as setting a program reminder, scheduling a recording for a program, recording a program, or any other suitable user action. In other embodiments, the advertisement may be linked to a target media guidance display screen based on a user profile, which may contain a history of user interaction with the media guidance application, user interaction with advertisements, viewing history, product ordering history, preferences, or any other suitable user specific information. In yet other embodiments, the advertisement may be linked to a target media guidance display screen based on the content of the advertisement, the advertiser, advertiser specifications, or a priority designation. For example, advertisements designated as high priority may be linked to a media guidance display screen that is displayed more frequently than other media guidance display screens. In still yet other embodiments, the advertisement may be linked to a target media guidance display screen based on any of the information, or combination thereof, stored in advertising data store 410 of FIG. 4, such as past display history.

Furthermore, data structure 500 of FIG. 5 may include target ad display region index 514. Target ad display region index 514 may link an advertisement to a particular advertisement display region of a media guidance display screen, such that the advertisement may be displayed in the target advertisement display region each time the user accesses the display screen containing the display region. As in the discussion above regarding target display screen index 512, the advertisement may be linked to a target advertisement display region (e.g., by control circuitry 304 of FIG. 3) in response to a user action, or based on a user profile, the content of the advertisement, the advertiser, advertiser specifications, a priority designation, or any other information, or combination thereof, stored in advertising data store 410 of FIG. 4. In some cases, the advertisement may be linked to a target advertisement display region based on the location of the advertisement display region within the media guidance application display screen. For example, the advertisement may be linked to a target advertisement display region that is located on the top, bottom, side, middle, or any other location on the screen. Advertisements may be linked to advertisement display regions based on a priority designation, such that high priority advertisements may be linked to advertisement display regions at desirable locations.

In some embodiments, media guidance application display screens and/or advertisement display regions within the display screens may be assigned a priority designation. These priority designations may be used in conjunction with advertisement priority designations to match particular advertisements with particular media guidance application display screens and particular advertisement display regions within the display screens. In some cases, an advertisement display region may inherit the priority designation of the media guidance application display screen within which it is displayed. In other cases, the priority designation of a media guidance application display screen may be used, along with other factors, to determine the priority designation of an advertisement display region within the display screen. Although, discussion herein focuses on the priority designations of advertisements as a criteria for advertisement placement, any suitable characteristic or associated data may be used to link or match advertisements to media guidance application display screens or advertisement display regions. For example, advertisements may be linked to display screens or advertisement display regions of differing priority on the basis of the advertisement's advertiser, cost, popularity, or other associated data.

The priority designations may be predetermined for some display screens or advertisement display regions, for example, based on typical user guidance activities within a media guidance application. In other embodiments, the priority designations for some display screens or advertisement display regions may be determined based at least in part on monitoring user interactions with the media guidance application, or based at least in part on user preferences, profiles, settings, and configuration information stored in the media guidance application. For example, the priority designation for a given display screen or advertisement display region may be determined based on the number of times a user clicks on an advertisement displayed in the display screen or advertisement display region. In addition, the priority designation of some display screens or advertisement display regions may be customized based on a given user or a given user's profile if multiple users have access to media content or the media guidance application from one or more of their user equipment devices (e.g., user equipment device 300 of FIG. 3). It should be understood that an advertisement may be linked to a target display screen or advertisement display region that has any suitable priority designation. Priority designations and their uses are described in greater detail in Thomas et. al., U.S. patent application Ser. No. 12/555,142, filed Sep. 8, 2009, which is hereby incorporated by reference herein in its entirety.

With continuing reference to FIG. 5, although only one target display screen index and one target advertisement display region index is shown in structure 500, it should be understood that an advertisement may be linked to more than one target display screen or more than one advertisement display region. That is, data structure 500 may include more than one target display screen index 512 linking to different target media guidance display screens, and may include more than one target ad display region index 514 linking to different target advertisement display regions within the media guidance display screens. In addition, each target ad display region index 514 may be associated with at least one target display screen index 512. In some embodiments, target ad display region index 514 and target display screen index 512 may be combined into one index.

In some embodiments, data structure 500 of FIG. 5 may include ad display properties 510. Ad display properties 510 may provide the display characteristics of an advertisement, such as its dimensions, orientation, sizing constrains, format (e.g., banner, panel, embedded/channel, etc.), or other display characteristics and limitations. Ad display properties 510 may provide this information directly or through a link to another location or data structure with the information. The advertisement display properties may be used to determine where an advertisement may be displayed or to define the manner in which the advertisement is displayed. For example, the advertisement display properties may limit the display screens and advertisement display regions that may display the advertisement. A vertical advertisement, for instance, may be displayed in a vertical advertisement display region but not a horizontal advertisement display region.

Data structure 500 of FIG. 5 may also include ad counter index 502. Ad counter index 502 may store or link to a storage location with information about the number of times the advertisement has been displayed (e.g., in a media guidance application). The ad counter may be used to determine whether the advertisement should be linked with a target display screen or a target advertisement display region, or it may be used to determine the priority of the advertisement. In some embodiments, if the ad counter exceeds a predetermined value, the advertisement may be linked to a display screen or advertisement display region with a low priority designation where the advertisement is less likely to be viewed. Similarly, if the counter is below a predetermined value, or zero, the advertisement may be linked to a target display screen or advertisement display region that has a relatively high priority designation. This may ensure that the advertisement is linked to a display screen that may be frequently accessed by the user.

Ad counter index 502 may alternatively or additionally store or link to a storage location with information on the number of times a user interacts with the advertisement. For example, ad counter index 502 may keep track of the number of times the advertisement has been selected or otherwise engaged by a user or a group of users (e.g., using a media guidance application). This may be used, for example, to determine the click-through rate for the advertisement. A click-through rate may be a way of measuring the effectiveness of an advertisement and may indicate the likelihood a user would interact with the advertisement, or a similar advertisement, if displayed in the future. The click-through rate may be determined by dividing the number of times a user (or users) selected the advertisement by the number of times the advertisement was displayed (e.g., the number of advertisement impressions). For example, the number of times a user selected the advertisement may be stored in ad counter index 502, and that number may be divided by the number of times the advertisement was displayed, which may also be stored in ad counter index 502.

In some embodiments, an advertisement may be linked to a target display screen or advertisement display region in accordance with the value of the counter or the click-through rate of the advertisement. As such, an advertisement associated with a high counter value or click-through rate may be displayed more frequently than other advertisements in the media guidance application. For example, the advertisement may be linked to a target display screen or advertisement display region that has a relatively high priority designation. In other embodiments, the media guidance application may generate and/or display advertisements with similar properties or characteristics to advertisements associated with high click-through rates, as discussed in further detail below. Ad counter index 502 may also be used to track the popularity of advertisements, as further discussed below. Although only one ad counter index is shown in structure 500, it should be understood that an advertisement may be linked to more than one counter. Advertisement counters and their functionalities are described in greater detail in Rosenberg et al. U.S. patent application Ser. No. 11/880,447, filed Jul. 20, 2007, which is hereby incorporated by reference herein in its entirety.

Data structure 500 of FIG. 5 may also include space to store display screen history index 504. Display screen history index 504 may provide information about past display screens of the media guidance application, or past advertisement display regions within the display screens, in which an advertisement has been displayed. Display screen history index 504 may be used, for example, to determine which display screens or advertisement display regions have previously displayed the advertisement. In some embodiments, display screen history index 504 may be used to determine the next target display screen or target advertisement display region in a predetermined sequence. In other embodiments, display screen history index 504 may be used in conjunction with ad counter index 502 to provide, for example, information on user interaction with an advertisement displayed in a particular display screen or advertisement display region (e.g., the number of times a user selects the advertisement or the number of times the advertisement is displayed). Thus, the click-through rates of the advertisement in each particular display screen or advertisement display region may be determined.

Display screen history index 504 may also include information relating to the length of time that an advertisement associated with display screen history index 504 is displayed in each particular display screen or advertisement display region. This may be useful, for example, in determining in which display screens or advertisement display regions an advertisement may receive the most exposure.

Data structure 500 may additionally include space for other information or links associated with an advertisement, links to related advertisements in another data structure, or any other suitable links or information corresponding to the advertisement. It should be understood that data structure 500 of FIG. 5 is both simplified and illustrative. Although data structure 500 is shown as a continuous block, the information in data structure 500 may alternatively be separated into different locations. In some embodiments, the information in data structure 500 may be stored in multiple tables of a relational database with indexes to link the separated data.

Figure 6:
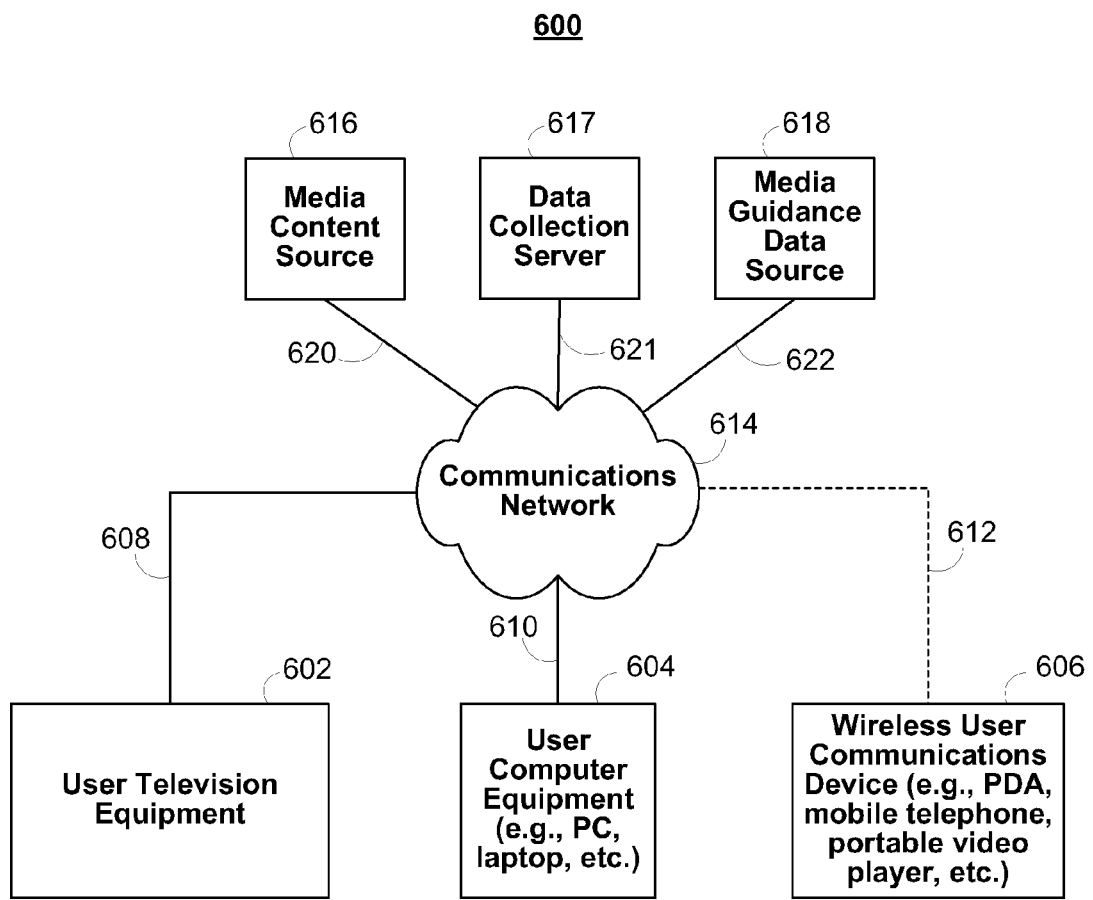
FIG. 6 shows a diagram of an illustrative cross-platform interactive media system in accordance with an embodiment of the invention.

FIG. 6 shows illustrative system 600 for providing media guidance to different types of user equipment devices in accordance with an embodiment of the present invention. User equipment devices 300 and 400 of FIGS. 3 and 4, respectively, may be implemented in system 600 of FIG. 6 as user television equipment 602, user computer equipment 604, wireless user communications device 606, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 602 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 604 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 602, user computer equipment 604, and wireless user communications device 606 may utilize at least some of the system features described above in connection with FIG. 3 and, as a result, include flexibility with respect to the type of media content available on the device. For example, user television equipment 602 may be Internet-enabled allowing for access to Internet content, while user computer equipment 604 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 600, there is typically more than one of each type of user equipment device but only one of each is shown in FIG. 6 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device may change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes media content source 616, data collection server 617, and media guidance data source 618 coupled to communications network 614 via communication paths 620, 621, and 622, respectively. Paths 620, 621, and 622 may include any of the communication paths described above in connection with paths 608, 610, and 612. Communications with the media content source 616, data collection server 617, and media guidance data source 618 may be exchanged over one or more communications paths, but are shown as a single path in FIG. 6 to avoid overcomplicating the drawing. In addition, there may be more than one of each of media content source 616, data collection server 617, and media guidance data source 618, but only one of each is shown in FIG. 6 to avoid overcomplicating the drawing. (The different types of each of these sources are discussed below.) If desired, media content source 616, data collection server 617, and media guidance data source 618 may be integrated as one source device. Although communications between sources 616, 617, and 618 with user equipment devices 602, 604, and 606 are shown as through communications network 614, in some embodiments, sources 616, 617, and 618 may communicate directly with user equipment devices 602, 604, and 606 via communication paths (not shown) such as those described above in connection with paths 608, 610, and 612.

Media content source 616 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 616 may be the originator of media content (e.g., a television broadcaster, a Webcast provider, etc.) or may not be the originator of media content (e.g., an on-demand media content provider, an Internet provider of video content of broadcast programs for downloading, etc.). Media content source 616 may include cable sources, satellite providers, on-demand providers, Internet providers, or other providers of media content. Media content source 616 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Data collection server 617 may receive data from user equipment devices 602, 604, and 606. This data may include data sent to media content source 616 or media guidance data source 618. The data may also include requests or queries initiated from user equipment (e.g., devices 602, 604, and 606) and responses to requests or queries initiated from server equipment (e.g., sources 616, 617, and 618). In addition, data collection server 617 may receive monitoring data gathered by a media guidance application implemented on user equipment devices 602, 604, and 606. For example, user interaction with the media guidance application may be monitored, compiled into a data set, and sent to data collection server 617. Monitoring data may include user viewing habits (e.g., which programs a user views or records, and when the user views or records the programs), user interaction with advertisements (e.g., which advertisements a user selects, and when a user selects the advertisement), user purchasing habits (e.g., what types of products or services a user orders, and when the orders are placed), user audio preferences (e.g., what audio content or what types of audio content a user records, purchases, or selects for identification), and other suitable information. Monitoring using interactions in a media guidance application is discussed in more detail in Alexander et al. U.S. Pat. No. 6,177,931, issued Jan. 23, 2001, which is hereby incorporated by reference herein in its entirety.

Data collection server 617 may collect and correlate data received from multiple users to determine commonalities between users, prevalent behavior patterns, and popular features, queries, and preferences. For example, data collection server 617 may compile monitoring data of user interaction with a number of advertisements to determine the most effective advertisements and/or characteristics common to the most effective advertisements. As another example, data collection server 617 may compile monitoring data of user interaction with the media guidance application to determine the most frequently accessed features, options, and display screens. Data collection server 617 may use these determinations and other analyses of user generated data to provide updated features and new services to other users. For example, based on a determination of popular video programs, data collection server 617, or sources 616 or 618, may provide advertisements or alerts to other users about future broadcasts or delivery options for the popular programs. As another example, the media guidance application may collect information on automatically generated advertisements from a plurality of users, determine which of the generated advertisements are most effective, and provide the most effective generated advertisements to other users automatically. Advertisement generation and automatic distribution are described in further detail below.

Media guidance data source 618 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance data source 618 may additionally provide advertisement information (e.g., text, images, media clips, etc.) to the user equipment devices. The advertisement information may include any advertisements used by the media guidance application to provide advertisements to a user. For example, the advertisement information may include any of the information included in advertising data structure 500 of FIG. 5. The advertising information provided to the user devices may have originated from any suitable source, which may or may not be media guidance data source 618. In some embodiments, the advertising information may have originated from various different advertisers or program sponsors, and may have originated from media content source 616 or data collection server 617.

Media guidance application data, including the advertisement information, may be provided to the user equipment devices using any suitable approach or combination of approaches. In some embodiments, the guidance application may be a stand-alone interactive television program guide that receives program guide data via a data feed (e.g., a continuous feed, trickle feed, or data in the vertical blanking interval of a channel). Program schedule data and other guidance data, such as advertising information, may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media content source 616, data collection server 617, or media guidance data source 618 may be provided to users' equipment using a client-server approach. For example, a guidance application client residing on the user's equipment may initiate sessions with source 618 to obtain guidance data when needed. Media guidance data source 618 may provide user equipment devices 602, 604, and 606 the media guidance application itself or software updates for the media guidance application.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 (FIG. 3) and partially on a remote server as a server application (e.g., media guidance data source 618). The guidance application displays may be generated by the media content source 616, data collection server 617, media guidance data source 618, or a combination of these sources, and transmitted to the user equipment devices. Sources 616, 617, and 618 may also transmit data for storage on the user equipment, which then generates the guidance application displays based on instructions processed by control circuitry.

In some embodiments, a client-server system may be used to select and/or generate advertisements across different platforms. For example, a new advertisement may be generated to fill an available advertisement display region regardless of whether the advertisement display region is contained in a display screen of an online guidance application (e.g., on user computer equipment 604 of FIG. 6), an interactive television program guide (e.g., on user television equipment 602), or on any other type of guidance application. Advertisements may be generated and/or provided across different platforms based on any suitable approach. For example, data collection server 617 may generate the advertisements and may transmit the generated advertisement to the user equipment (e.g., user equipment 604).

Media guidance system 600 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 6.

In one approach, user equipment devices may communicate with each other within a home network. User equipment devices may communicate with each other directly via short-range point-to-point communication schemes describe above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home may use their media guidance application to communicate directly with media content source 616 to access media content. Specifically, within a home, users of user television equipment 604 and user computer equipment 606 may access the media guidance application to navigate among and locate desirable media content. Users may also access the media guidance application outside of the home using wireless user communications devices 606 to navigate among and locate desirable media content.

Thus, it should be understood that each of the embodiments discussed above in connection with FIGS. 1-6 are merely illustrative, and any other suitable configuration may be contemplated. For example, referring back to FIG. 4, data stores 408, 410, or 412 may be located remotely from user equipment 400, and may be implemented instead in, for example, data collection server 617. In these embodiments, the advantages and functions of the media guidance application described above may be utilized even when a client-server system is used. That is, advertisements may be selected and/or generated at a remote location, and a display may be provided to the user equipment device from the remote source with the selected advertisement. In addition, it will be appreciated that while the discussion of media content has focused on video content, the principles of media guidance may be applied to other types of media content, such as text, music, images, etc.

The following flow diagrams serve to illustrate processes involved in some embodiments of the invention. Where appropriate, these processes may, for example, be implemented completely in the processing circuitry of a user equipment device (e.g., processing circuitry 404 of FIG. 4) or may be implemented at least partially in a media guidance source remote from the user equipment devices (e.g., media guidance source 618 of FIG. 6).

Figure 7:
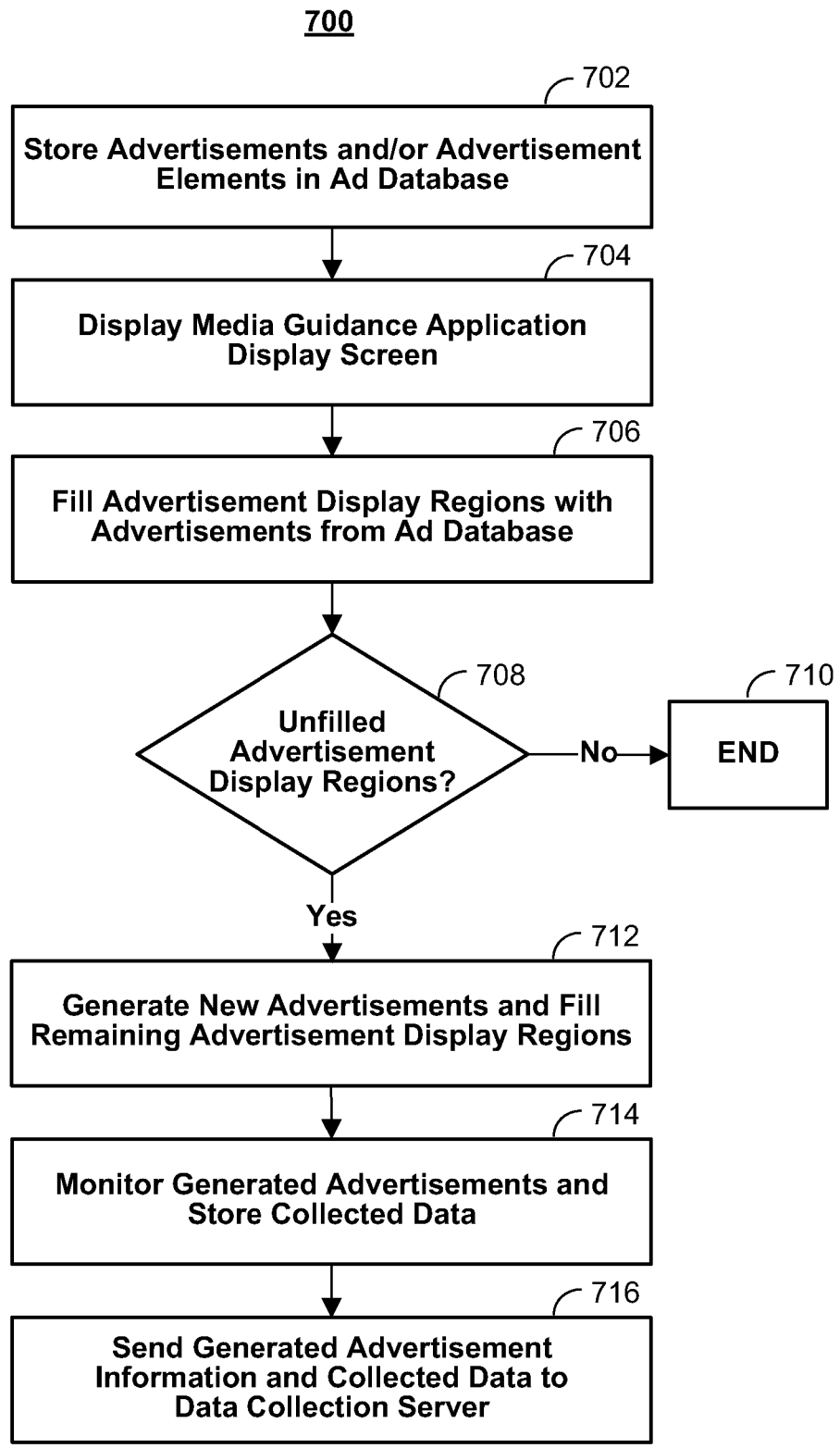
FIG. 7 shows an illustrative flow diagram for filling advertisement display regions and collecting data related to generated advertisements in accordance with an embodiment of the invention.

Referring now to FIG. 7, illustrative flow diagram 700 is shown for filling advertisement display regions and collecting data related to generated advertisements in accordance with some embodiments of the invention. At step 702, a plurality of advertisements and/or advertisement elements may be stored in an advertisement database (e.g., advertising data store 410 of FIG. 4). The advertisements and advertisement elements may be of any suitable format (e.g., text, images, video clips, etc.). Advertisements may be "display-ready" promotions made up of one or more advertisement elements. Alternatively, one or more advertisement elements may be assembled to create an advertisement (e.g., a logo, picture, and button may be assembled into an interactive advertisement). Advertisement elements may be any type of media object included within an advertisement, as described in greater detail above in connection with data store 410 of FIG. 4. Advertisements and advertisement elements may also be extracted and/or retrieved from data or media stored within data stores 408 and 412, or from data or media stored in a remote location.

The advertisements and advertisement elements may be received in the video blanking interval of a television broadcast or using any other suitable technique discussed above in connection with FIG. 6. The advertisements and advertisement elements may be received from any suitable source, such as from a television program advertiser or sponsor remote from a viewer (e.g., media guidance data source 618 of FIG. 6). Advertisement elements may also be retrieved from data stores local to the user (e.g., data stores 408, 410, and 412 of FIG. 4). For example, a program listing may be retrieved from schedule information data store 408. As another example, a video clip of a recorded television broadcast may be retrieved from recorded media data store 412. In some embodiments, the received advertisements and advertisement elements may be stored in a storage system local to the viewer (e.g., in a user's set top box).

At step 704 of FIG. 7, a display screen of the media guidance application may be displayed or retrieved for future display. The display screen may have one or more advertisement display regions. For example, display screen 100 of FIG. 1, containing advertisement display regions 123, 124, and 125, may be displayed or retrieved for future display. At step 706, the media guidance application may select one or more of the advertisements stored in the advertisement database (step 702) to fill one or more of the available advertisement display regions. The media guidance application may select advertisements by searching the advertisement database for advertisements linked to the advertisement display regions. For example, the media guidance application may search a plurality of data structures 500 to locate advertisements linked to particular advertisement display regions via indices 512 and 514 of FIG. 5. Alternatively, the media guidance application may search the advertisement database for advertisements that meet certain criteria. These criteria may be associated with the available advertisement display regions, the user, other information displayed in the media guidance application, and/or the advertisements themselves. For example, the media guidance application may search the advertisement database for advertisements that meet the display constraints of the available advertisement display regions (e.g., using index 510 of FIG. 5). As another example, the media guidance application may search the advertisement database for advertisements that match the interests of a user currently logged into the media guidance application (e.g., stored in a user profile at user equipment). The interests of the user may be determined by express user selections of favorites or preferences, or may be determined by monitoring the user's activities. As yet another example, the media guidance application may search the advertisement database for advertisements that are relevant to a current television program or other information concurrently or recently displayed in the media guidance application.

In some embodiments, the media guidance application searches for advertisements based on user interaction with the media guidance application or based on user viewing habits. For example, in response to a user selection of a program listing, the media guidance application may search for advertisements related to the selected listing. In other embodiments, the media guidance application searches for advertisements based on previous user interaction with advertisements. For example, the media guidance application may search for advertisements that are related or unrelated (e.g., in style, genre, content, etc.) to advertisements with which the user previously interacted. As another example, the media guidance application may search for advertisements that have not previously been displayed and/or selected, or have been displayed and/or selected relatively few times compared with the other advertisements available. As yet another example, the media guidance application may search for advertisements that are associated with high click-through rates (e.g., when presented to other users). In addition, the media guidance application may search for advertisements related or unrelated to other advertisements displayed in the same media guidance application display screen.

As discussed above in connection with FIG. 5, advertisements may be associated with a priority designation. In some embodiments, an advertisement may be designated a high priority advertisement or a low priority advertisement. The priority of an advertisement may be based on the relevance of the advertisement to the presently displayed media guidance application display screen, or the relevance of the advertisement to the user (e.g., as determined from a user profile). In other cases, the priority of an advertisement may correlate to a level of service purchased by an advertiser or sponsor. For example, an advertiser may purchase a certain number of advertisement impressions and/or a certain time interval for advertisement display. Pending fulfillment of the purchased level of service (e.g., before the advertisement is displayed the desired number of impressions, or before the desired time interval has lapsed), the advertisement may be designated high priority. Then, following fulfillment of the purchased level of service, the advertisement may be designated low priority. Similarly, a stored advertisement unassociated with a pre-purchased level of service may be designated low priority. Generated advertisements may also be designated a certain priority. Generated advertisements, and techniques for generating advertisements, are discussed in further detail below.

An indication of advertisement priority may be stored, for example, within data structure 500 of FIG. 5. In some embodiments, all high priority advertisements are linked to particular advertisement display regions (e.g., via index 514 of FIG. 5), and an advertisement may be identified as a high priority advertisement based on the presence of a non-null link. In other embodiments, high priority advertisements may be stored in an advertisement database specifically for high priority advertisements, or they may be stored within a particular section (or table) of an advertisement database containing both high priority and low priority advertisements.

In some embodiments, the media guidance application initially searches the advertisement database for suitable high priority advertisements only. These high priority advertisements may then be used to fill the available advertisement display regions of the display screen of step 704. However, there may be instances when no high priority advertisements are identified in the advertisement database, or the number of identified high priority advertisements may be less than the number of available advertisement display regions. In some embodiments, the advertisement database is then searched for low priority advertisements, and the media guidance application may select one or more low priority advertisements to fill one or more of the available advertisement display regions. The media guidance application may search for and select low priority advertisements using any of the techniques and methods described above in connection with high priority advertisements. In some embodiments, the media guidance application may search for low priority advertisements that are related or unrelated (e.g., in style, genre, content, etc.) to high priority advertisements with which the user previously interacted.

Advertisements may be associated with data (or stored in a particular location) indicating whether the advertisement is permitted to be displayed by the media guidance application. For example, an advertiser may specify whether an advertisement is permitted to be displayed. In some embodiments, only particular advertisements or advertisements associated with particular advertisers are selected for display by the media guidance application. For example, the media guidance application may select only advertisements associated with an advertiser that has a standing agreement with the application provider to pay fees for the advertisement (e.g., per impression or when a user interacts with the advertisement). As another example, the media guidance application may select only advertisements associated with an advertiser that has expressly permitted display of the advertisements.

At step 708, the media guidance application determines whether any of the advertisement display regions remain unfilled. If all advertisement display regions are filled, the process terminates at step 710. However, if one or more advertisement display regions remain unfilled, the process continues to step 712. Advertisement display regions may remain unfilled, for example, when the number of available advertisement display regions exceeds the number of suitable stored advertisements in the advertisement database. For example, an advertisement display region may remain unfilled when no advertisements are linked to the advertisement display region (e.g., via index 512 or 514 of FIG. 5). As another example, an advertisement display region may remain unfilled when the advertisement database does not include any advertisements that meet the display constraints (e.g., dimensions) of the advertisement display region. In some cases, advertisements may have associated constraints. For instance, an advertisement may have display characteristics (e.g., size, orientation, etc.) that restrict the advertisement to only certain advertisement display regions. As another example, an advertisement may be limited to a maximum number of impressions, may be limited to particular users based on user profile criteria, may be restricted to certain display screens or advertisement display regions, or any combination thereof. These constraints may be inherent (i.e., a result of the display characteristics of the advertisement itself) or may be determined by a sponsor, advertiser, viewer, or other suitable entity. For example, an advertisement may have associated constraints based on a level of service elected by an advertiser. These constraints may prevent a stored advertisement from being selected to fill an available advertisement display region.

At step 712, the media guidance application generates new advertisements to fill the remaining unfilled advertisement display regions. The new advertisements may be generated using advertisement templates, a set of rules provided to the media guidance application, or any other suitable method, and may be customized according to the properties of the advertisement display region, a user profile, or any other suitable criteria. Advertisement generation is described below in greater detail in connection with FIG. 9. At step 714, data associated with the advertisement generation process (e.g., style, font, color, artwork, layout, display dimensions, template information, etc.), data associated with the advertisement content (e.g., advertiser, product or service information, etc.), data associated with the advertisement display (e.g., display location, display time, etc.), and/or data describing user interaction with the advertisement (e.g., user selections, purchases, etc.) is collected and, in some cases, locally stored (e.g., in the advertisement database or in a user profile). In addition to the above, the collected data may include any of the data associated with a generated advertisement described above in connection with data store 410 of FIG. 4. Moreover, the generated advertisement itself, and/or a data structure representative of the advertisement (e.g., data structure 500 of FIG. 5), may be stored in the advertisement database. The collected data may include all data necessary to recreate the generated advertisement at another time or at a remote location. The collected data may also include information on the click-through rate of the advertisement, information on purchases made using the advertisement, or any other measure of advertisement effectiveness. This information may be collected by the media guidance application through monitoring user interaction with the generated advertisement. For example, the media guidance application may monitor an advertisement to collect information on the number of impressions or the frequency, type, or timing of user interaction with the advertisement. The collected information may be stored in a user profile or sent to a server for further processing and storage.

In addition, the media guidance application may monitor user interaction with a number of generated advertisements in order to determine the most effective generated advertisements. For example, ad counter index 502 of FIG. 5 may keep track of the number of times a generated advertisement has been selected or otherwise engaged by a user. The media guidance application may record the properties of effective generated advertisements, including information on what types of elements were selected and displayed in the advertisement, how the elements were arranged, and other suitable data describing the attributes of the generated advertisement. When an advertisement template is used to generate an advertisement later determined to be effective, the media guidance application may record which template was used along with data describing the customization of the template (e.g., color scheme, style, etc.). In some embodiments, effective generated advertisements and/or data describing effective generated advertisements are sent to a remote server (e.g., data collection server 617 of FIG. 6).

At step 716, the data collected at step 714 and any other suitable data associated with the generated advertisement may be transmitted to a data collection server remote from user equipment (e.g., data collection server 617 of FIG. 6). The data collection server may collect and store information associated with a plurality of generated advertisements transmitted from a number of different users, as described in greater detail below in connection with FIG. 10. The remote server may provide these advertisements to other users. In addition, the data collection server may be configured to determine an entity (i.e., a company, organization, advertiser, promoter, etc.) associated with a received advertisement from the received data, and may calculate fees associated with the display of the advertisement or user interaction with the advertisement. The data collection server may generate an invoice listing the fees and provide the invoice to the entity.

It should be understood that the steps of flow diagram 700 are merely illustrative. Any of the steps of flow diagram 700 may be modified, omitted, or rearranged, two or more of the steps may be combined, or any additional steps may be added, without departing from the scope of the invention. For example, steps 714 and 716 may be omitted. As another example, step 702 may be performed concurrently with step 706 such that advertisements are only received and stored when needed to fill the particular advertisement display regions of a media guidance application display screen.

Figure 8:
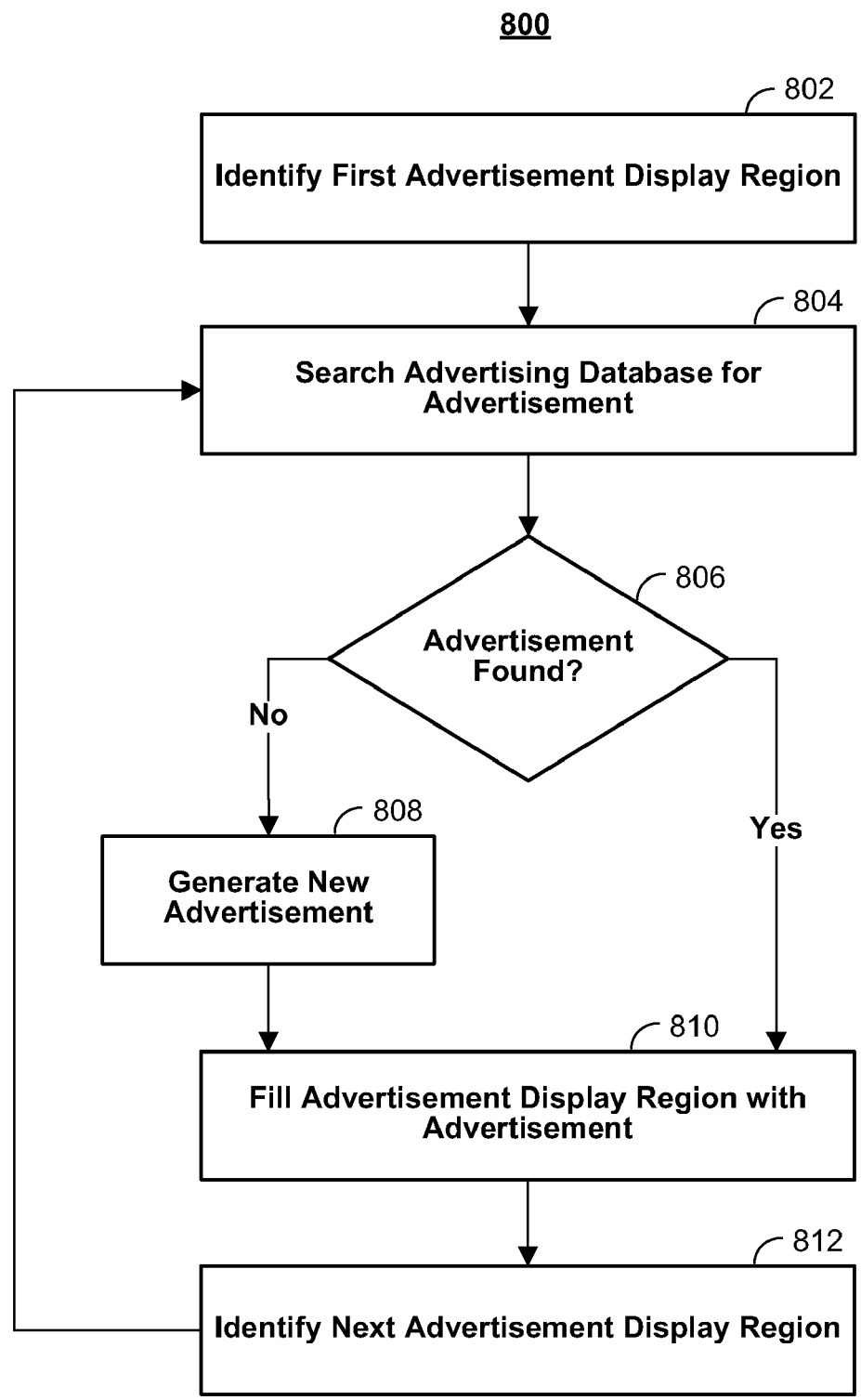
FIG. 8 shows an illustrative flow diagram for identifying stored advertisements, generating new advertisements, and filling advertisement display regions in accordance with an embodiment of the invention.

FIG. 8 shows illustrative flow diagram 800 for identifying stored advertisements, generating new advertisements, and filling advertisement display regions in accordance with some embodiments of the invention. At step 802, a first advertisement display region in a media guidance application display screen is identified. The advertisement display regions may be identified and filled before the display screen is presented to the user, such that all the advertisements are displayed simultaneously. Alternatively, the advertisement display regions may be identified and filled after the display screen is presented to the user, such that the advertisements are displayed as they become available. At step 804, the media guide application searches the advertisement database for advertisements to fill the identified advertisement display region. As described above in connection with step 706 of FIG. 7, an advertisement may be linked to the identified advertisement display region or it may be selected to fill the identified advertisement display region based on suitable criteria (e.g., priority designation). At step 806, the media guidance application determines whether an advertisement was found in the advertisement database for the identified advertisement display region. If so, the process continues with step 810. Otherwise, at step 808, the media guidance application generates a new advertisement for the identified advertisement display region, as described in greater detail below in connection with FIG. 9.

At step 810, the media guidance application fills the identified advertisement display region with the selected advertisement. The selected advertisement may be an advertisement located within the advertisement database at step 804 or an advertisement generated at step 808. At step 812, the media guidance application identifies the next advertisement display region and proceeds to repeat the advertisement selection process beginning with step 804. The advertisement selection process may thus iterate through all advertisement display regions until all the regions are filled.

It should be understood that the steps of flow diagram 800 are merely illustrative. Any of the steps of flow diagram 800 may be modified, omitted, or rearranged, two or more of the steps may be combined, or any additional steps may be added, without departing from the scope of the invention. For example, in embodiments in which advertisements are linked to specific media guidance application display screens and/or advertisement display regions, step 802 may be performed after step 804, thus requiring only one search of the advertising database. In particular, the search performed in step 804 may produce a group of advertisements each linked to one of the available advertisement display regions. Then, starting with step 802, the advertisement display regions may be identified one by one and those that have a linked advertisement may be filled immediately while those without a linked advertisement may be filled with a generated advertisement.

Figure 9:
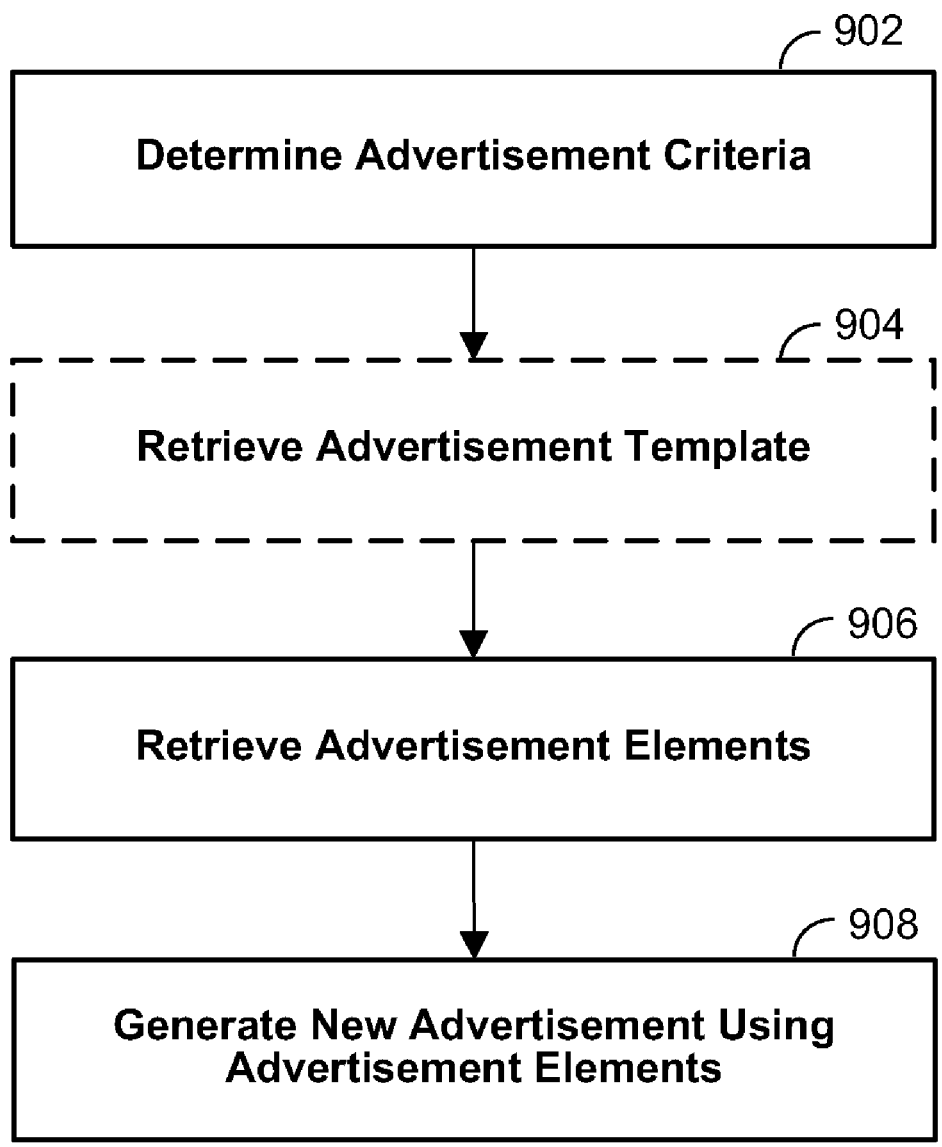
FIG. 9 shows an illustrative flow diagram for generating new advertisements using advertisement elements in accordance with an embodiment of the invention.

FIG. 9 shows illustrative flow diagram 900 for generating new advertisements in accordance with some embodiments of the invention. At step 902, the media guidance application determines advertisement criteria for generating the new advertisement. Advertisement criteria may include any suitable criterion for determining the composition and content of a new advertisement. In some embodiments, advertisement content may be selected from a list or record of products, services, and/or promotions. For example, a list of new cars being advertised by automobile manufacturers may be maintained and a particular car may be selected for presentation in the new advertisement. As another example, a particular video-on-demand (VOD) listing may be selected from a number of VOD listings for presentation in the new advertisement. The selection of a particular product, service, or promotion may be random. Alternatively, the selection may be based on user interest (e.g., based on user viewing habits, user interaction with other advertisements, demographic data, etc.), user interaction with the media guidance application (e.g., in response to a user selection of a program listing), and/or relevance to the target display screen, other displayed advertisements, or information concurrently or recently displayed in the media guidance application. The list of products, services, and/or promotions may be provided to the media guidance application from a remote source. Alternatively, the media guidance application may automatically compile a list of products, services, and/or promotions. For example, the media guidance application may compile a list of VOD listings that match the user's interests. As another example, the media guidance application may compile a list of products from metadata associated with media content previously received at user equipment, such as video programs and stored advertisements. In one scenario, for instance, the media guidance application may monitor a video program viewed by the user, determine a product or service displayed in the program based on metadata associated with the program, and record an indication of the product or service.

Advertisement content may also be selected based on the availability of advertisement elements used to generate new advertisements. New advertisements may be generated using any of the advertisement elements accessible to the media guidance application as well as metadata or other descriptive information associated with the advertisement elements. As described above, this information may include data identifying a company or organization, a product or service, or any other suitable information associated with an advertisement element. The media guidance application may determine whether sufficient advertisement elements are available to generate an advertisement for a given product, service, or promotion using any suitable technique. For example, the media guidance application may search local data stores 408, 410, or 412, or a remote location, for advertisement elements. As another example, the media guidance application may determine available advertisement elements from a list of available advertisement elements stored, for example, in data store 410. As yet another example, the media guidance application may determine available advertisement elements through media file index 508 of data structure 500 (FIG. 5), which may link an advertisement element to other related advertisement elements.

Advertisement criteria for determining the composition of a new advertisement may include display specifications such as maximum and minimum dimensions, display orientation, and screen location, which may be determined from the display properties of the target advertisement display region. Advertisement criteria may also include stylistic specifications such as color scheme, fonts, layout and formatting, which may be determined from the display properties of the media guidance application, the target display screen, or other display elements displayed concurrently with the advertisement display region. Stylistic specifications may also be defined by, or determined, from the advertiser, the advertisement elements, or information otherwise associated with the advertisement content. In addition, stylistic specifications may be determined from suitable information stored in a user profile, such as the stylistic properties of advertisements the user has previous selected or otherwise interacted with.

At step 904, the media guidance application retrieves an advertisement template in accordance with an embodiment of the invention. Advertisement templates may be retrieved from a remote server or may be stored at user equipment (e.g., data store 410). Advertisement templates may be provided to user equipment at any suitable time or upon request. Advertisement templates may be used to generate new advertisements in accordance with a predefined design. For example, advertisement templates may provide specific display regions for displaying different types of media elements. An advertisement template, for instance, may provide a display region for a logo, a display region for a graphic of a product, and/or a display region for a textual description of the product. Using an advertisement template, the media guidance application need only specify what elements belong in the various display regions of the template. The sizes and locations of the display regions may be predetermined by the template and/or may be customized within set parameters. Advertisement templates may also contain configurable options that determine the response of the advertisement to user interaction. For example, the template may be configurable to load a specified web site upon user selection of the advertisement.

A number of templates may be available to the media guidance application for use in different advertisement display regions or for use with different types of advertising content. For example, templates may be available in different shapes and sizes. As another example, different templates may be available for advertising a product, a service, or a television program. Different templates may also exhibit different color schemes, fonts, or other styles and/or different numbers of regions for displaying media elements. In some embodiments, advertisement templates may be associated with particular advertisers or particular products, services, or promotions. The media guidance application may select a template from the available advertisement templates using any suitable selection criteria. For example, a template may be selected based on the advertiser or advertised product, service, or promotion. As another example, a template may be selected in accordance with the advertisement criteria identified in step 902. As yet another example, a template may be selected in accordance with the display properties of the target advertisement display region, user preferences (as stored in a user profile), or based on the available advertisement elements. In some embodiments, advertisement templates are themselves advertisement elements, and are selected in step 906.

At step 906, the media guidance application may retrieve the advertisement elements associated with the advertisement content criteria determined in step 902. The media guidance application may search for the necessary advertisement elements in an advertisement database (e.g., data store 410) or other data store using, for example, the descriptive data associated with each element. Alternatively, the media guidance application may retrieve advertisement elements using the links between, or lists of, related advertisement elements (e.g., via index 508 of FIG. 5). In some cases, the media guidance application may request an advertisement element from a remote server. In other cases, the media guidance application may extract advertisement elements from stored media (e.g., media stored in data store 412), including video programs or other advertisements.

At step 908, the media guidance application may generate a new advertisement from the retrieved advertisement elements. In some embodiments, the new advertisement may be generated using the template retrieved in step 904. In other embodiments, the new advertisement may be generated in accordance with set rules or guidelines, which may be contained in an advertisement generation algorithm. For example, the media guidance application may generate an advertisement by selecting a graphic of a product and overlaying descriptive information. When using an advertisement template, the media guide application may simply specify which elements belong in the various display regions of the template and generate a new advertisement from the combination of the template and the specified elements.

New advertisements may be generated according to the advertisement criteria determined in step 902, such as the properties of the target advertisement display region. For example, the elements within a new advertisement may be positioned or sized in accordance with the display dimensions and/or orientation of the target advertisement display region. In addition, the number or types of media elements displayed in the new advertisement may be customized according to the display dimensions and/or orientation of the target advertisement display region. For instance, an advertisement with limited display area may be generated using only a graphic of a product, while a larger advertisement may also include a textual description of the product. New advertisements may also be generated with interactive features. For example, a new advertisement may be selectable and may provide additional information upon selection (e.g., purchase options or a web site associated with the advertised product or service). As another example, a new advertisement may be generated with the capability to rotate amongst various images or to play video at specific time intervals. In addition, new advertisements may be generated in accordance with user preferences. For example, the media guidance application may compare the display characteristics of a number of previously displayed advertisements to determine common characteristics of advertisements that receive user interaction. The media guidance application may determine, for instance, that the user often responds to high color contrast, particular fonts, or any other display characteristic. In turn, the media guidance application may generate a new advertisement with the determined display characteristics.

In some embodiments, the media guidance application may generate a program listing as a new advertisement. As described above in connection with FIG. 1, a program listing may include distinct elements, such as title and description, each of which may be customized individually. Listing customization may include font, font size, font style (e.g., bold or italicized), font color, effects (e.g., strikethrough), etc. Listings customization may also include enhancements such as graphical (or other media) indicators. Listings customization may be performed according to the advertisement criteria determined in step 902. For example, listings customization may be performed in accordance with user preferences or a user profile (e.g., in accordance with user demographic data or monitored user data). In addition, a generated program listing may be selectable and may perform a specified function upon user selection. For example, a generated program listing may be configured to change the background image of the current media guidance display screen, or another display region, upon selection.

It should be understood that the steps of flow diagram 900 are merely illustrative. Any of the steps of flow diagram 900 may be modified, omitted, or rearranged, two or more of the steps may be combined, or any additional steps may be added, without departing from the scope of the present invention. For example, step 904 may be omitted and new advertisements may be generated without using an advertisement template.

Figure 10:
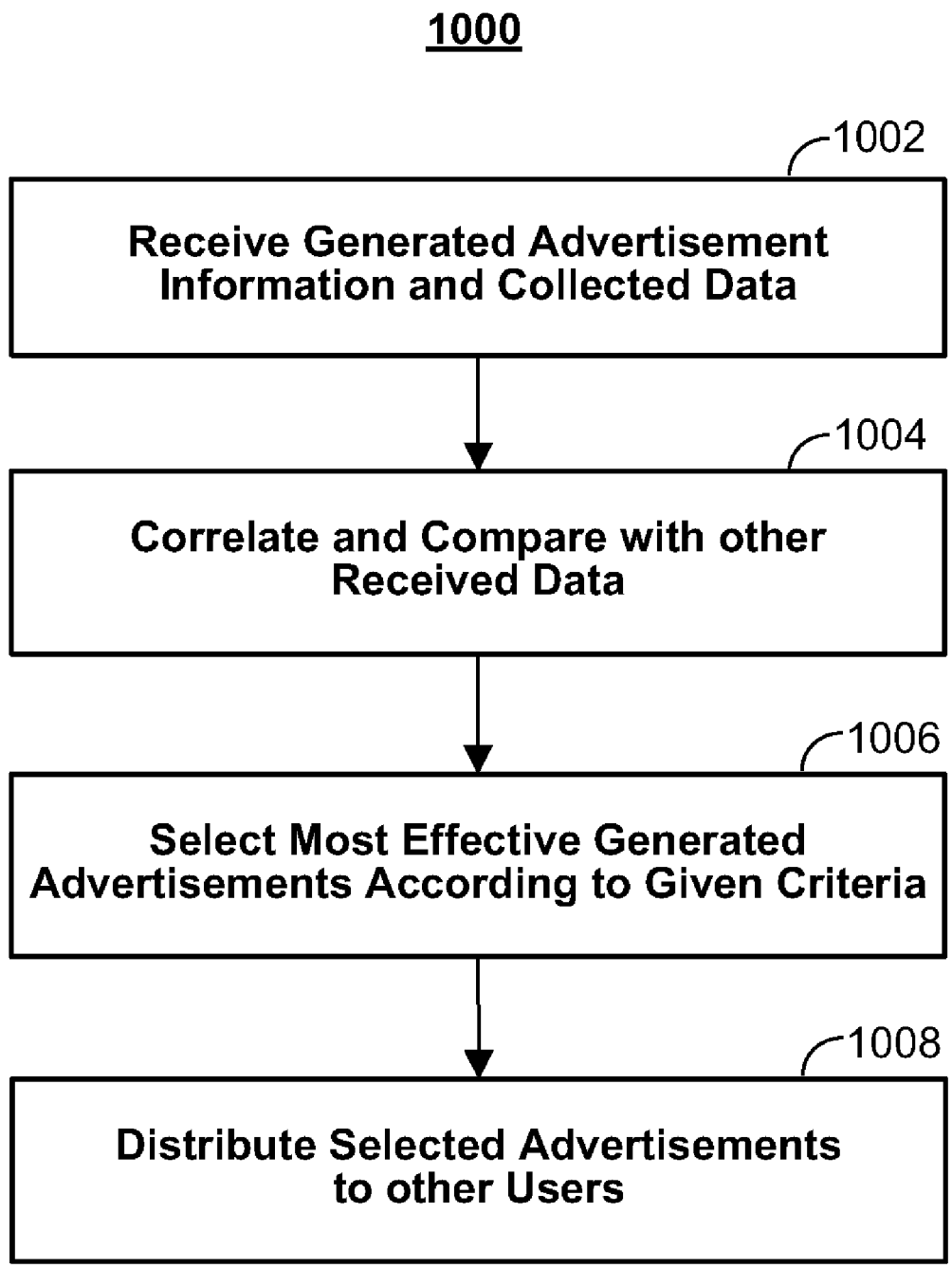
FIG. 10 shows an illustrative flow diagram for distributing generated advertisements to multiple users in accordance with an embodiment of the invention.

FIG. 10 shows an illustrative flow diagram for distributing generated advertisements to multiple users in accordance with some embodiments of the invention. As discussed above in connection with step 714 of FIG. 7, a media guidance application that generates a new advertisement may collect data associated with the advertisement generation process, the advertisement content, the advertisement display history, and/or user interaction with the advertisement. For example, the media guidance application may record the properties of generated advertisements, including information on what types of elements were selected and displayed in the advertisement, how the elements were arranged, and other suitable data describing the attributes of the generated advertisement. The collected data may include all data necessary to recreate the generated advertisement at another time or at a remote location, and may include the advertisement elements or the advertisement itself. As further described in connection with step 716 of FIG. 7, the data collected at step 714 and any other suitable data associated with the generated advertisement may be transmitted to a data collection server remote from user equipment (e.g., data collection server 617 of FIG. 6). The collected data may be transmitted through communications network 614 of FIG. 6.

At step 1002, the data collection server receives and stores the generated advertisement and/or the associated collected data transmitted from user equipment (e.g., user equipment 602, 604, or 606 of FIG. 6). The data collection server may receive multiple transmissions from the same user, or from other users, each corresponding to one or more generated advertisements. As such, the data collection server may collect and store information associated with a plurality of generated advertisements transmitted from a number of different users. At step 1004, this information may be correlated and compared to determine, for example, commonalities between the generated advertisements. For example, the data collection server may analyze the received information to determine which advertisement templates are used in the most effective advertisements. The effectiveness of advertisements may be determined from the click-through rates of the advertisements, information on purchases made using the advertisements, or any other measure of advertisement effectiveness. As another example, the data collection server may analyze the received information to determine which advertised products, services, or promotions (such as a VOD offerings), receive the most user attention (e.g., based on user interaction with the generated advertisement). The data collection server may also correlate and compare the received data to determine, for example, which advertisements advertise the same or similar products, services, or promotions. As yet another example, the data collection server may correlate and compare the received data to determine common user profile characteristics of users that interact with the generated advertisements. User profile data may also be part of the data collected and transmitted to the data collection server (e.g., in step 716 of FIG. 7).

At step 1006, the data collection server selects the most effective generated advertisements. In some embodiments, the selection may be performed in accordance with suitable selection criteria. For example, the data collection server may select the most effective generated advertisements for particular products, services, or promotions. As another example, the data collection server may select the most effective generated advertisements for particular types of users (e.g., particular demographics, or users with particular interests or characteristics, as stored in a user profile). As yet another example, the data collection server may select the most effective generated advertisements associated with an advertiser that has agreed to pay for additional distribution of generated advertisements.

At step 1008, the data collection server distributes the selected advertisements to other users. For example, the selected advertisements may be provided to all users connected to the data collection server, or to a subset of users in accordance with the selection criteria of step 1006. For example, advertisements related to cars may be provided only to those users with an interest in cars, as determined from user profile information. These advertisements may be distributed as paid or unpaid advertisements. The advertisements may also be distributed with corresponding data structures (e.g., data structure 500 of FIG. 5), and the indexes of the data structure may be determined from the received data of step 1002. For example, the advertisements may be linked to the advertisement display regions that were the original targets of the generated advertisements. In addition, the advertisements may be distributed with an indication that they were generated by a media guidance application (e.g., in data structure 500 of FIG. 5). The distributed advertisements may be further monitored at the receiving user equipment to determine advertisement effectiveness. The data gathered by the monitoring may be transmitted to the data collection server and added to the collected data used to perform steps 1004-1008.

It should be understood that the steps of flow diagram 1000 are merely illustrative. Any of the steps of flow diagram 1001 may be modified, omitted, or rearranged, two or more of the steps may be combined, or any additional steps may be added, without departing from the scope of the present invention. For example, step 1004 may be omitted and all generated advertisements provided to the data collection server may be distributed to other users.

It will be understood that the foregoing is only illustrative of the principles of the invention, and that various modifications may be made by those skilled in the art without departing from the scope and spirit of the invention. Those skilled in the art will appreciate that the present invention may be practiced by other than the described embodiments, which are presented for purposes of illustration and not of limitation, and the present invention is limited only by the claims that follow.

What is claimed is:

1. A method for automatically generating advertisements using a media guidance application implemented at least in part on user equipment, the method comprising:
    displaying, on a display at the user equipment, a media guidance application display screen, wherein the media guidance application display screen comprises an advertisement display region;
    identifying advertisement criteria, including advertisement content and advertisement composition, for the advertisement display region;
    searching the advertisement database for a stored advertisement that satisfies the advertisement criteria associated with the advertisement display region or is assigned to the advertisement display region;
    upon determining that the advertisement database does not include a stored advertisement satisfying the criteria and a stored advertisement assigned to the advertisement display region:
        retrieving a plurality of distinct advertisement elements from an advertisement database in accordance with the identified advertisement criteria to assemble together into a new generated advertisement;
        generating a new advertisement for display in the advertisement display region by assembling the plurality of distinct advertisement elements;
        displaying, on the display at the user equipment, the generated advertisement in the advertisement display region;
        monitoring a user interaction with the generated advertisement to produce user interaction data; and
        transmitting the user interaction data to a remote data-collection server.

2. The method of claim 1 further comprising transmitting data describing the generated advertisement to the remote data-collection server.

3. The method of claim 1, wherein the criteria associated with the advertisement display region is at least one of display size, display location, priority designation, and advertisement type.

4. The method of claim 1, wherein the advertisement criteria further includes at least one of a product, a service, a promotion, an advertiser, user interests, user viewing habits, user interaction with other advertisements, user interaction with the media guidance application, user demographic data, target display screen properties, availability of advertisement elements, display size, display location, and stylistic specifications.

5. The method of claim 1, wherein the advertisement elements include at least one of text, graphics, video, and audio.

6. The method of claim 1 further comprising retrieving an advertisement template, wherein the generating a new advertisement comprises inserting the advertisement elements into predefined regions within the advertisement template.

7. The method of claim 6 further comprising specifying media elements to be displayed or played in response to a user action.

8. The method of claim 1, wherein the generated advertisement is a program listing, and wherein the plurality of distinct advertisement elements are program listing elements, the method further comprising customizing the program listing elements in accordance with user profile data.

9. The method of claim 1 further comprising at least one of storing the generated advertisement and transmitting the generated advertisement to the remote data-collection server.

10. The method of claim 1 further comprising:
    determining that the generated advertisement has attracted a predetermined amount of user interaction based on the user interaction data; and
    transmitting the generated advertisement to the remote data-collection server in response to the determination.

11. A system for automatically generating advertisements using a media guidance application implemented at least in part on user equipment, the system comprising:
    user equipment configured to:
        display a media guidance application display screen on a display, wherein the media guidance application display screen comprises an advertisement display region; and
    processing circuitry configured to:
        identify advertisement criteria, including advertisement content and advertisement composition, for the advertisement display region;
        search the advertisement database for a stored advertisement that satisfies the advertisement criteria associated with the advertisement display region or is assigned to the advertisement display region;
        upon determining that the advertisement database does not include a stored advertisement satisfying the criteria and a stored advertisement assigned to the advertisement display region:
            retrieve a plurality of distinct advertisement elements from an advertisement database in accordance with the identified advertisement criteria to assemble together into a new generated advertisement;
            generate a new advertisement for display in the advertisement display region by assembling the plurality of distinct advertisement elements;
            display the generated advertisement in the advertisement display region;

monitor a user interaction with the generated advertisement to produce user interaction data; and
transmit the user interaction data to a remote data-collection server.

12. The system of claim 11 further comprising communications circuitry configured to transmit data describing the generated advertisement to the remote data-collection server.

13. The system of claim 11, wherein the criteria associated with the advertisement display region is at least one of display size, display location, priority designation, and advertisement type.

14. The system of claim 11, wherein the advertisement criteria further includes at least one of a product, a service, a promotion, an advertiser, user interests, user viewing habits, user interaction with other advertisements, user interaction with the media guidance application, user demographic data, target display screen properties, availability of advertisement elements, display size, display location, and stylistic specifications.

15. The system of claim 11, wherein the advertisement elements include at least one of text, graphics, video, and audio.

16. The system of claim 11, the processing circuitry further configured to retrieve an advertisement template, wherein the generating a new advertisement comprises inserting the advertisement elements into predefined regions within the advertisement template.

17. The system of claim 16, the processing circuitry further configured to specifying media elements to be displayed or played in response to a user action.

18. The system of claim 11, wherein the generated advertisement is a program listing, and wherein the plurality of distinct advertisement elements are program listing elements, the processing circuitry further configured to customize the program listing elements in accordance with user profile data.

19. The system of claim 11, the processing circuitry further configured to perform at least one of storing the generated advertisement and transmitting the generated advertisement to the remote data-collection server.

20. The system of claim 11, the processing circuitry further configured to:
determine that the generated advertisement has attracted a predetermined amount of user interaction based on the user interaction data; and
transmit the generated advertisement to the remote data-collection server in response to the determination.

* * * * *